United States Patent
Kondo et al.

(10) Patent No.: US 6,195,463 B1
(45) Date of Patent: Feb. 27, 2001

(54) MULTIRESOLUTION IMAGE PROCESSING AND STORAGE ON A SINGLE CHIP

(75) Inventors: Tetsujiro Kondo; Hideo Nakaya; Tsutomu Watanabe, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/108,986

(22) Filed: Jul. 1, 1998

(30) Foreign Application Priority Data

Jul. 3, 1997 (JP) .................................................. 9-178010
May 6, 1998 (JP) ................................................ 10-123217

(51) Int. Cl.[7] .............................. G06K 9/36; G06K 9/46
(52) U.S. Cl. ........................................... 382/240; 382/305
(58) Field of Search .................................. 382/232, 240, 382/299, 305, 234, 226, 298; 345/439, 515–517, 519, 521, 127–132; 358/444, 524, 433, 427, 447, 403–404, 451; 348/398, 408, 437, 438, 718–719, 561, 581–582, 704; 711/1, 100, 104, 117; 341/79; 707/1

(56) References Cited

U.S. PATENT DOCUMENTS

| | | | |
|---|---|---|---|
| 4,870,497 | * 9/1989 | Chamzas et al. | 358/447 |
| 5,448,310 | * 9/1995 | Kopet et al. | 348/719 |
| 5,598,214 | * 1/1997 | Kondo et al. | 382/240 |
| 5,621,405 | * 4/1997 | Park et al. | 358/427 |
| 5,859,667 | 1/1999 | Kondo et al. | 348/414 |
| 5,886,794 | 3/1999 | Kondo et al. | 358/428 |
| 5,930,394 | 7/1999 | Kondo et al. | 382/232 |
| 5,933,533 | * 8/1999 | Fukuda et al. | 382/234 |
| 5,959,676 | 9/1999 | Kondo et al. | 348/421 |
| 5,982,938 | * 11/1999 | Dube | 382/240 |

FOREIGN PATENT DOCUMENTS 0 627 859   12/1994   (EP) .............................. H04N/7/13

OTHER PUBLICATIONS

Reduced–Difference Pyramid: a data structure for progressive image transmission Limin Wang, Morris Goldberg; Telecommunications Research Lecture at Ontario University to Ottawa Department of Electrical Engineering, Ottawa, Canada K1N 5N5, Jul. 28, 1989, No. 7 pp. 708–716, XP000033797.

* cited by examiner

Primary Examiner—Amelia Au
Assistant Examiner—Timothy M. Johnson
(74) Attorney, Agent, or Firm—Frommer Lawrence & Haug, LLP.; William S. Frommer

(57) ABSTRACT

The present invention relates to a storage device by which image data is hierarchically encoded and stored, and to a technique for reducing the size of the device and increasing processing speed. Size reduction and increased processing speed are realized by hierarchically encoding data stored in memory, by computing higher hierarchical data from lower hierarchy data, and by integrating the memory and the memory accessing circuits all on a single semiconductor chip (e.g., CMOS). The chip includes input writing and output reading, read and write address controllers, memory address decoders, read and write buffers, and a memory cell array.

12 Claims, 25 Drawing Sheets

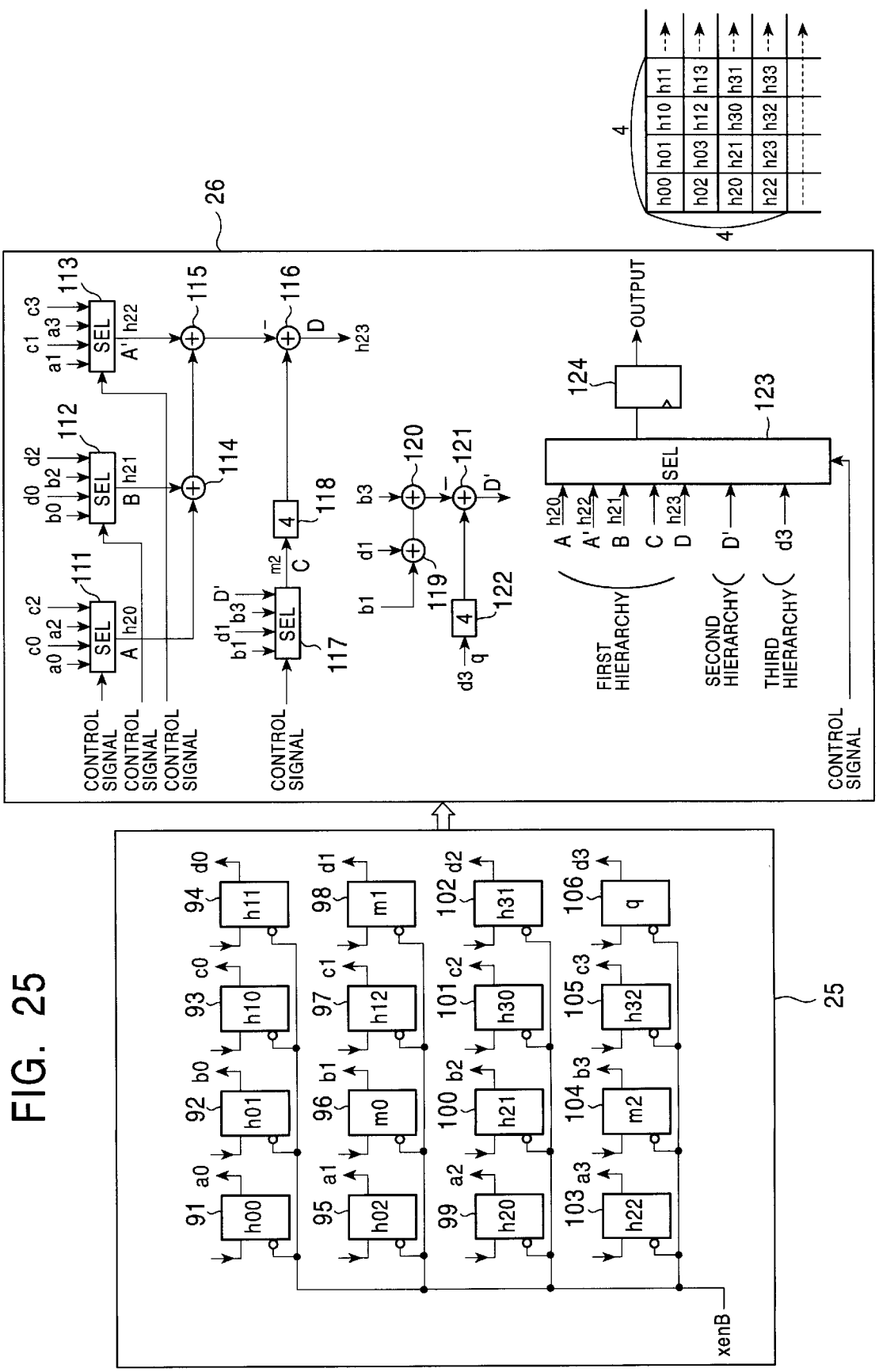

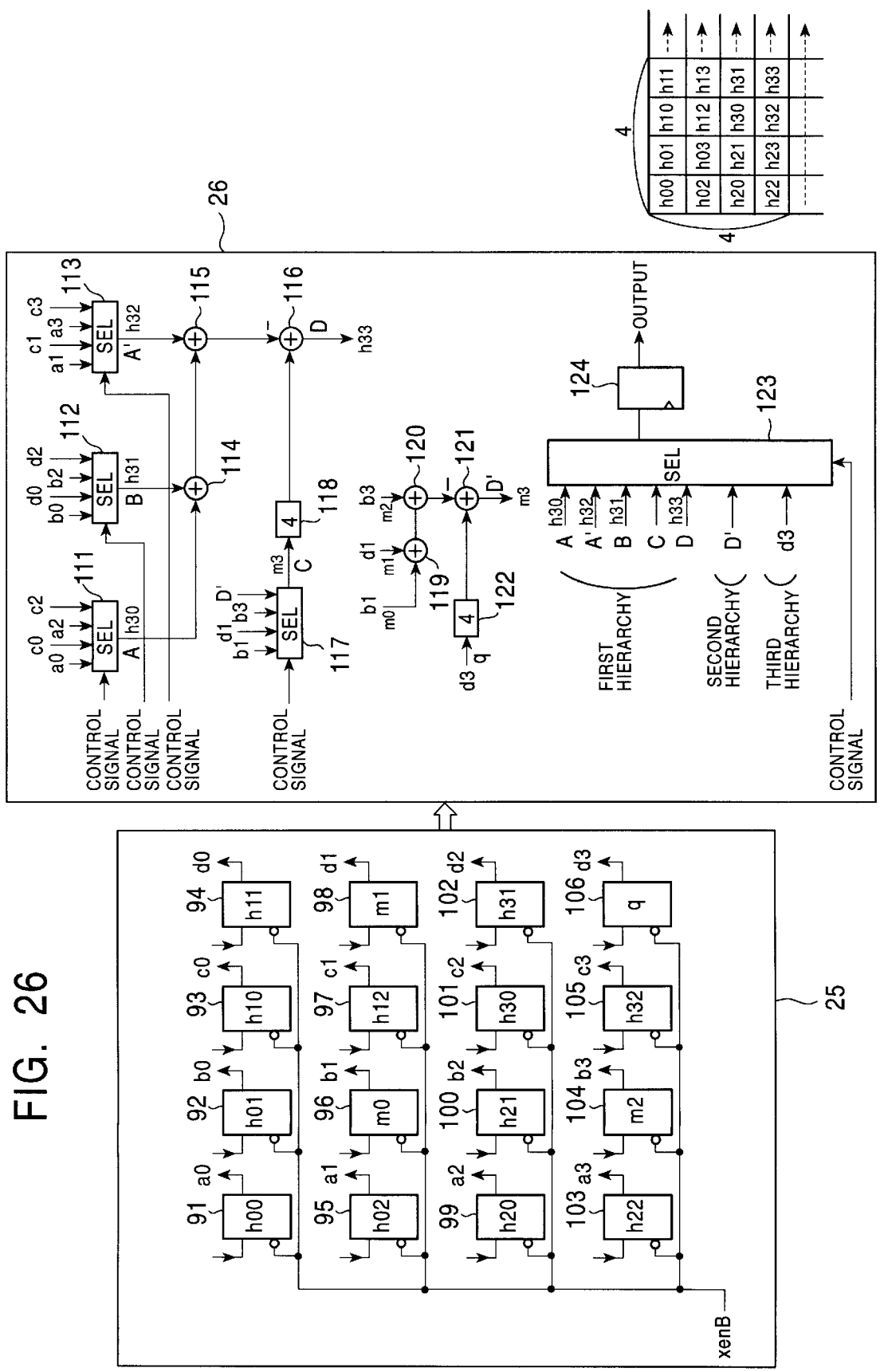

MULTIRESOLUTION IMAGE PROCESSING AND STORAGE ON A SINGLE CHIP

BACKGROUND OF THE INVENTION

1. Field of the Invention

The present invention relates to a storage device, and more particularly to a storage device which is preferably used for hierarchical encoding and storing of image data.

2. Description of the Related Art

There is a method for encoding high-resolution image data called "hierarchical encoding", wherein high-resolution image data is used as image data of the lowest hierarchy or first hierarchy and image data of a second hierarchy with fewer pixels than the image data of the first hierarchy is formed, image data of a third hierarchy with fewer pixels than the image data of the second hierarchy is formed, and so on until image data is formed to the highest hierarchy. The image data for each hierarchy is displayed on a monitor with resolution or number of pixels corresponding to that hierarchy. The user is able to select the hierarchically encoded image data corresponding with his/her monitor, and thus view corresponding contents.

However, considering an arrangement in which image data of a certain resolution is used as the image data for the lowest hierarchy or first hierarchy, image data of higher hierarchies is sequentially formed and the hierarchically encoded image data is stored or transferred, extra storage capacity or transferring capacity becomes necessary as compared to arrangements in which only the image data of the lowest hierarchy is stored or sent, because of the increased data of the upper hierarchies.

Accordingly, the present Applicant has in the past proposed a hierarchical encoding method in which there is no increase in storage capacity or the like.

For example, let us consider an arrangement in which the average value of 4 pixels formed of 2 by 2 pixels on the lowest hierarchy is used as the image value of the upper hierarchy, whereby 3-tier hierarchical encoding is performed. As shown in FIG. 1A, the average value m0 of the 4 pixels h00, h01, h02, and h03, these being the 2 by 2 pixels to the upper left of the 8 by 8 pixels, this m0 comprising 1 pixel to the upper left in the second hierarchy. In the same manner, the average value m1 of the 4 pixels h10, h11, h12, and h13 to the upper right of the image of the lowest hierarchy, the average value m2 of the 4 pixels h20, h21, h22, and h23 to the lower left thereof, and the average value m3 of the 4 pixels h30, h31, h32, and h33 to the lower right thereof, are calculated, these each comprising 1 pixel to the upper right, lower left, and lower right of the second hierarchy. Further, the average value q of the 4 pixels m0, m1, m2, and m3, these being the 2 by 2 pixels comprising the second hierarchy, is calculated, this average value q being used as the pixel of the image of the highest hierarchy.

In order to store or transfer all the pixels h00 through h03, h10 through h13, h20 through h23, h30 through h33, m0 through m3, and q, in that form without any change, storage capacity equal to m0 through m3 and q becomes necessary.

As shown in FIG. 1B, let us say that the pixel q of the third hierarchy is placed in the position of the lower right pixel m3 of the pixels m0 through m3 in the second hierarchy. The second hierarchy is thus comprised of the pixels m0 through m2 and q.

As shown in FIG. 1C, let us say that the pixel m0 of the second hierarchy is placed in the position of the lower right pixel h03 of the pixels h00 through h03 in the third hierarchy used to obtain the pixel m0. The remaining pixels of the second hierarchy, m1 through m2 and q are also positioned in the place of the pixels h13, h23, and h33 of the first hierarchy. The pixel q has not been directly obtained from pixel h30 through h33, but exists on the second hierarchy instead of the pixel m3 which has been directly obtained from the pixels h30 through h33, and so pixel q is positioned on the place of the pixel h33, instead of pixel m3.

As shown in FIG. 1C, the entire number of pixels is 4 by 4 pixels totaling 16 pixels, which is unchanged from the number of pixels of the lowest hierarchy as shown in FIG. 1A. Thus, increase in required storage capacity and the like can be prevented.

Decoding of the pixel m3 which has been replaced with pixel q and of the pixels h03, h13, h23, and h33 which have been respectively replaced with pixels m0 through m3 is performed as follows.

q is the average value of m0 through m3, so the expression q=(m0+m1+m2+m3)/4 holds. Hence, m3 can be obtained by the expression m3=4×q−(m0+m1+m2).

Also, m0 is the average value of h00 through h03, so the expression m0=(h00+h01+h02+h03)/4 holds. Hence, h03 can be obtained by the expression h03=4×m0−(h00+h01+h02). Also, h13, h23, and h33 can be obtained in the same way.

Known arrangements for performing such hierarchical encoding have involved general-use memory such as SRAM (Static Random Access Memory) or DRAM (Dynamic RAM) for storing the hierarchical encoding results being provided externally with an adder for calculating the average values, a shifter, a delay circuit for line delay, and so forth.

In the case shown in FIG. 1C, in order to obtain the pixel m0 of the second hierarchy, the expression m0=(h00+h01+h02+h03)/4 must be calculated. To that end, an adder for adding the values in the parenthesis, and a shifter for dividing the addition results by 4, i.e., to shift 2 bits to the right, are needed.

Further, in order to obtain the pixel m0 of the second hierarchy, the pixels h00 through h03 which exist over two lines in the first hierarchy become necessary. Supplying of image data to the memory is generally performed in the order of raster scanning. Reading and writing of the image data to the memory is also performed in the order of raster scanning, i.e., one line at a time.

The line that begins with h00 is delayed one line worth in the delay circuit, waits for the line beginning with h02 to be supplied, then calculates m0, following which the line beginning with h00 and the line beginning with h02 are written to the memory.

In this way, known arrangements required that various types of circuits be provided externally to the memory, increasing the size of the device. There has also been the problem in that the various types of circuits provided externally to the memory restricted the processing speed of the overall device.

SUMMARY OF THE INVENTION

It is an object of the present invention to provide a storage device, information processing method, and information processing apparatus to solve the above-described problems.

In order to achieve the above object, the present invention provides a storage device, comprising: computing device for computing higher order hierarchy data from lower order hierarchy data; and memory for storing the lower order hierarchy data and the higher order hierarchy data; wherein the computing device and the memory are formed on a single chip.

Also, in order to achieve the above object, the present invention provides an information processing method, comprising: a step for storing the lower order hierarchy data in memory; a step for computing higher order hierarchy data from certain lower order hierarchy data by means of a computing unit provided on the chip on which the memory is formed; and a step for storing the higher order hierarchy data in memory.

Further, in order to achieve the above object, the present invention provides an information processing apparatus having a storage device, the memory comprising: computing device for computing higher order hierarchy data from lower order hierarchy data; and storage means for storing the lower order hierarchy data and the higher order hierarchy data; wherein the computing device and the storage means are formed on a single chip.

BRIEF DESCRIPTION OF THE DRAWINGS

FIG. 25 is a fifth diagram describing the reading operation of the storage device shown in FIG. 7; and FIG. 26 is a sixth diagram describing the reading operation of the storage device shown in FIG. 7.

DESCRIPTION OF THE PREFERRED EMBODIMENT

The following is a detailed description of an embodiment of the present invention.

Figure 2:
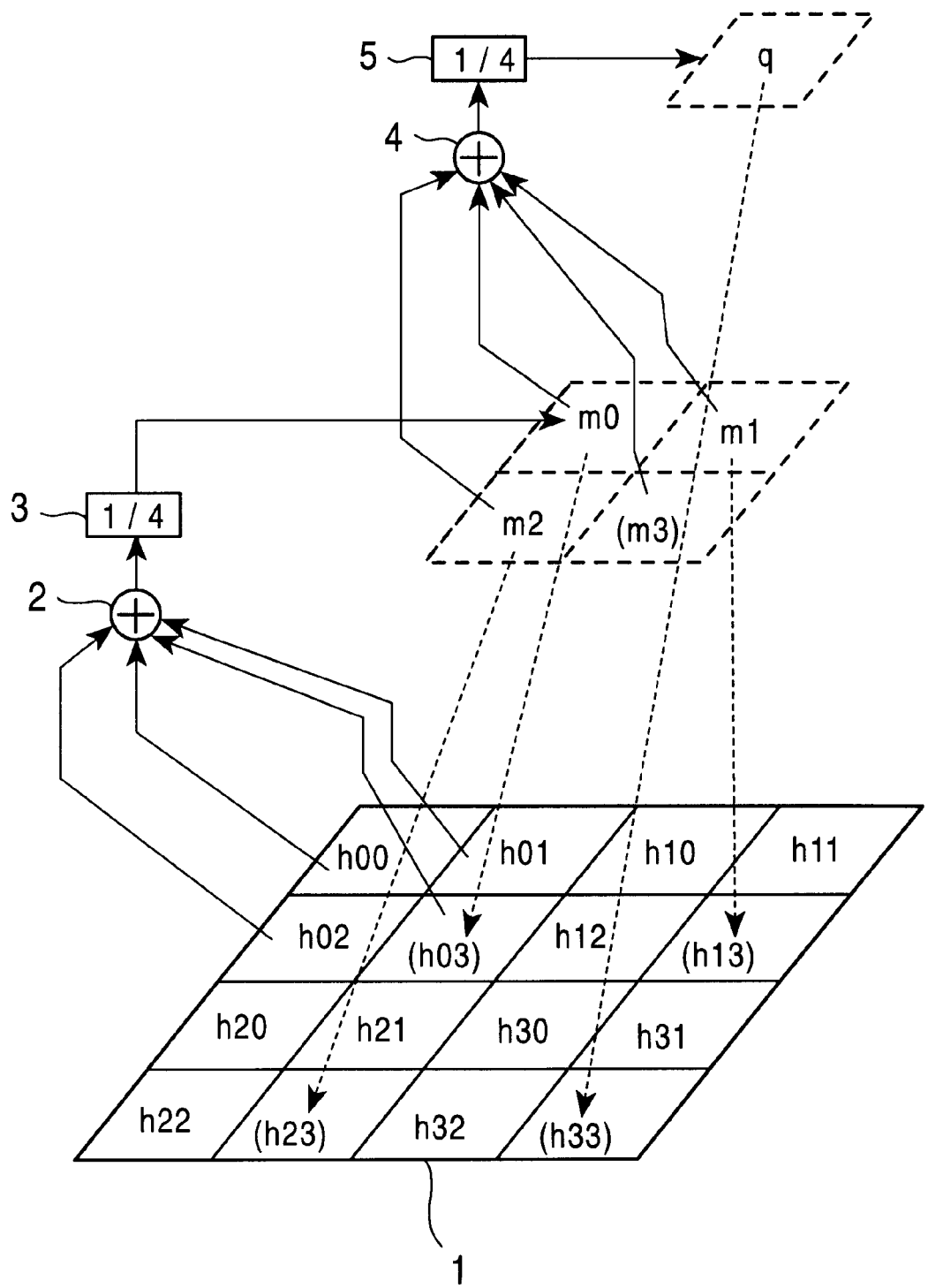
FIG. 2 is a first diagram describing the overview of a storage device to which the present invention has been applied.
Figure 3:
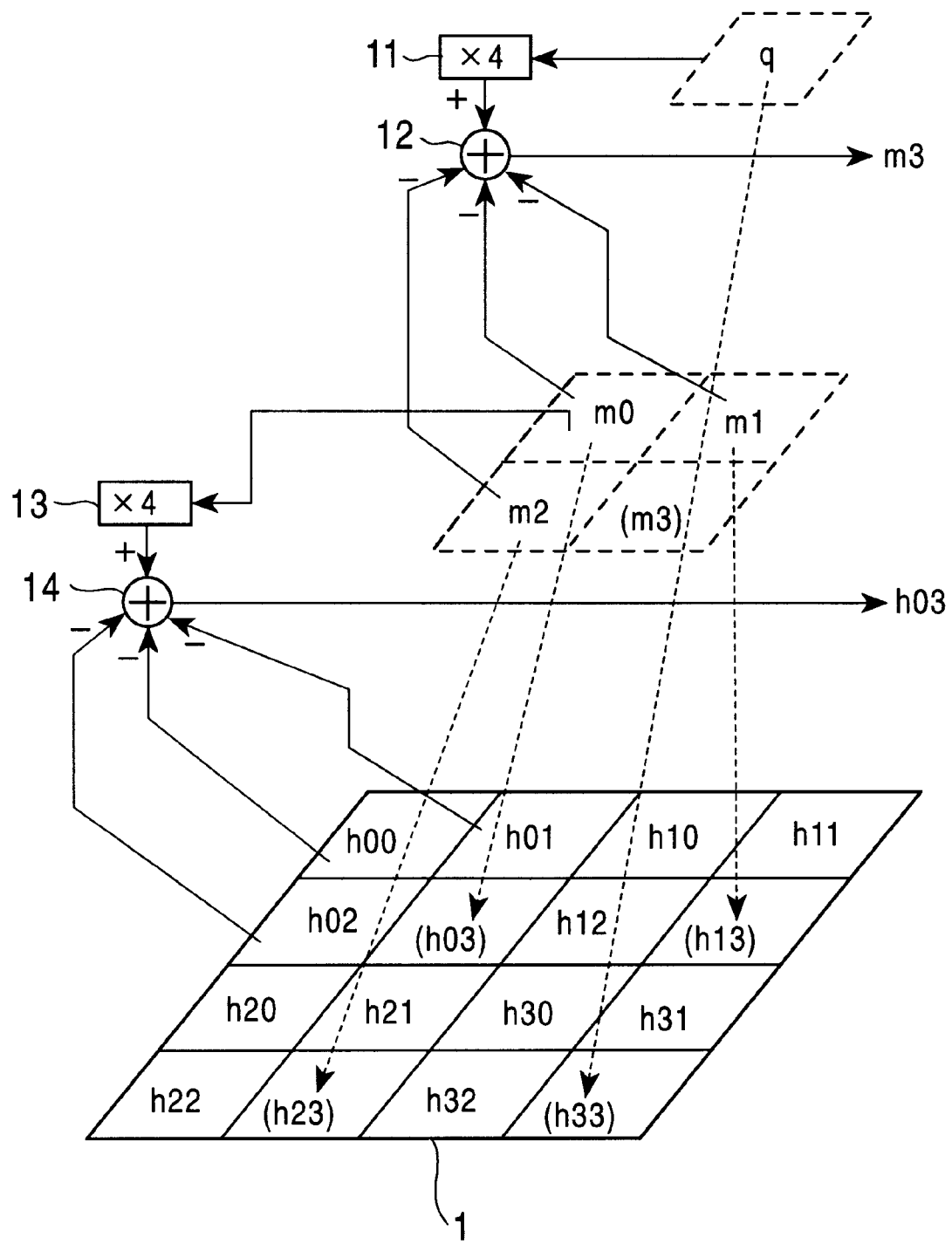
FIG. 3 is a second diagram describing the overview of a storage device to which the present invention has been applied.

FIG. 2 and FIG. 3 illustrate the overview of the architecture of a storage device to which the present invention has been applied.

Figure 1C:
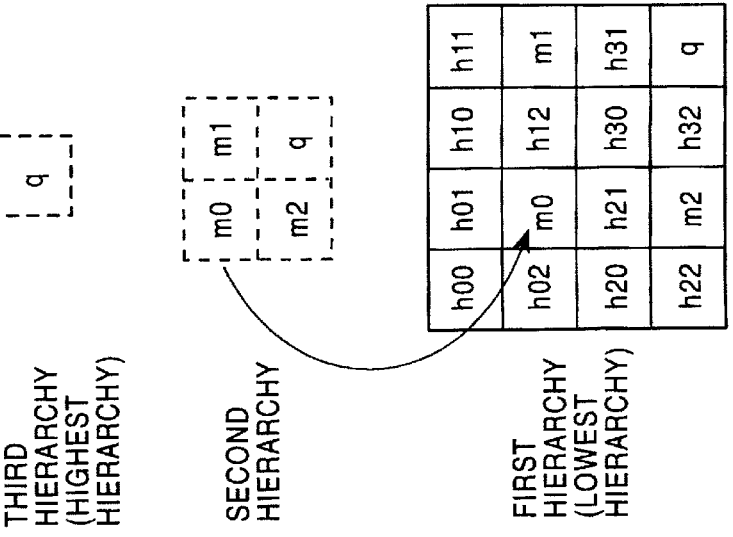
FIG. 1C is a diagram illustrating the third step of the hierarchical encoding method proposed by the present Applicant.
Figure 1B:
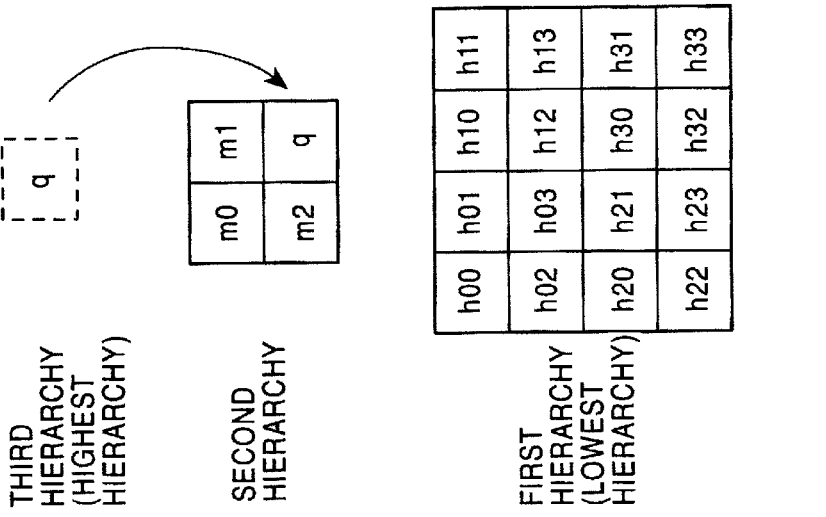
FIG. 1B is a diagram illustrating the second step of the hierarchical encoding method proposed by the present Applicant.
Figure 1A:
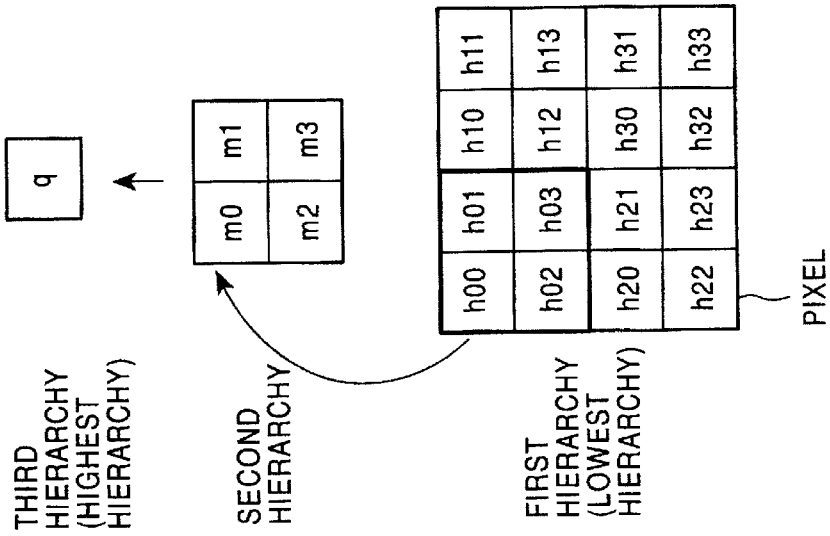
FIG. 1A is a diagram illustrating the first step of the hierarchical encoding method proposed by the present Applicant.

In the storage device illustrated in FIG. 2 and FIG. 3, as with the example shown in FIG. 1C, the average value of 4 pixels formed of 2 by 2 pixels on the lowest hierarchy is used as the image value of the upper hierarchy, whereby 3-tier hierarchical encoding is performed. The first 4 pixels of the first line comprising the lowest hierarchy are represented by h00, h01, h10, and h11, the first 4 pixels of the second line are represented by h02, h03, h12, and h13, the first 4 pixels of the third line are represented by h20, h21, h30, and h31, and the first 4 pixels of the fourth line are represented by h22, h23, h32, and h33.

The 4×4 pixels totaling 16 pixels of h00 through h03, h10 through h13, h20 through h23, and h30 through h33 are a smallest unit of pixels comprising the lowest hierarchy (first hierarchy); hereafter, this smallest unit will be referred to as a "block".

Pixel values comprising the image of the lowest hierarchy are supplied to the memory 1 in the order of raster scanning. The pixels h00, h01, h10, h11, and so forth making up the first line are each stored in a corresponding memory cell comprising the memory 1, as shown in FIG. 2.

The first pixel h02 comprising the second line is stored to the corresponding memory cell. Then, when the second pixel h03 comprising the second line is supplied, the pixels h00 through h02 stored in the memory 1 are read and supplied to the computing device 2. The pixel h03 is also supplied to the computing device 2, and the added values of the pixels h00 through h03 is calculated by the computing device 2. The added value is supplied to the computing device 3, and is divided by 4 in the computing device 3 by being shifted two bits to the right, consequently obtaining the average value m0 of the pixels h00 through h03 which is a pixel of the second hierarchy. The pixel m0 is stored in the memory cell of memory 1 corresponding with pixel h03.

The pixel h12 supplied following the pixel h03 is stored in the corresponding memory cell as is. When the next pixel h13 is supplied, the pixels h10 through h12 already stored in the memory 1 are read and supplied to the computing device 2. The pixel h13 is also supplied to the computing device 2, and the added value of the pixels h10 through h13 is calculated by the computing device 2. The added value is supplied to the computing device 3, and is divided by 4 in the computing device 3 by being shifted two bits to the right, consequently obtaining the average value m1 of the pixels h10 through h13 which is a pixel of the second hierarchy. The pixel m1 is stored in the memory cell of memory 1 corresponding with pixel h13.

In the same way, the pixels comprising the second line are stored, and the pixels of the second hierarchy are obtained and stored.

The pixels h20, h21, h30, and h31 comprising the third line are each sequentially stored in the corresponding memory cells in the same manner as that of the first line.

The first pixel h22 comprising the fourth line is stored to the corresponding memory cell. Then, when the second pixel h23 comprising the fourth line is supplied, the pixels h20 through h22 stored in the memory 1 are read and supplied to the computing device 2. The pixel h23 is also supplied to the computing device 2, and the added value m2 of the pixels h20 through h23 of the second hierarchy is calculated by the computing device 2 and computing device 3. The computing device 2 and the computing device 3 obtain the average value m2 of the pixels h20 through h23 which is a pixel of the second hierarchy, in the same manner as above. The pixel m2 is stored in the memory cell of memory 1 corresponding with pixel h23.

The pixel h32 supplied following the pixel h23 is stored in the corresponding memory cell as is. When the next pixel h33 is supplied, the pixels h30 through h32 already stored in the memory 1 are read, and as described above, the average value m3 of the pixels h30 through h33, which is a pixel of the second hierarchy, is calculated.

The pixel m3 is supplied to the computing device 4 along with the pixels m0 through m2 of the second hierarchy already stored in the memory 1. The added value of the pixels m0 through m3 is calculated in the computing device 4, and is supplied to the computing device 5. At the computing device 5, the added value from the computing device 4 is divided by 4 by being shifted two bits to the right, consequently obtaining the average value q of the pixels m0 through m3, which is a pixel of the third hierarchy. The pixel q is stored in the memory cell of memory 1 corresponding with pixel h33.

In the same way, the pixels comprising the fourth line are stored, and the pixels of the second hierarchy and the pixels of the third hierarchy are obtained and stored.

For the fifth line and the subsequent lines, processing the same as that for the first through fourth lines is repeated, thereby storing a hierarchically encoded image of one frame in the memory 1.

Since the processing performed on the blocks is identical, the following description will be made regarding only a block comprised of pixels h00 through h03, h10 through h13, h20 through h23, and h30 through h33.

Description will be made regarding reading of an image hierarchically encoded and stored in the memory 1, with reference to FIG. 3.

In the event of reading the pixel q of the highest hierarchy of the image hierarchically encoded as described above, the pixel q stored in the memory 1 is read.

In the case of reading the pixels m0 through m3 of the second hierarchy, the pixels m0 through m2 thereof stored in the memory 1 are read. Regarding the pixel m3, as shown in FIG. 3, the pixel q stored in the memory 1 is supplied to the computing device 11 and shifted two bits to the left thereby quadrupling the value, which is supplied to the computing device 12. The computing device 12 is also supplied with the pixels m0 through m2 stored in the memory 1, in addition to the output of the computing device 11. The computing device 12 obtains the pixel m3 by subtracting the pixels m0 through m2 from the output of the computing device 11. Since the pixel q is the average value of the pixels m0 through m3, the pixel m3 can be obtained by the expression m3=4×q−(m0+m1+m2).

Also, in the case of reading the pixels h00 through h03, pixels h10 through h13, pixels h20 through h23, and pixels h30 through h33 of the first hierarchy, the pixels h00 through h02, pixels h10 through h12, pixels h20 through h22, and pixels h30 through h32 thereof stored in the memory 1 are read. Regarding the pixel h03, the pixel m0 stored in the memory 1 is supplied to the computing device 13 and shifted two bits to the left thereby quadrupling the value, which is supplied to the computing device 14. The computing device 14 is also supplied with the pixels h00 through h02 stored in the memory 1, in addition to the output of the computing device 13. The computing device 14 obtains the pixel h03 by subtracting the pixels h00 through h02 from the output of the computing device 13. Since the pixel m0 is the average value of the pixels h00 through h03, the pixel h03 can be obtained by the expression h03=4×m0−(h00+h01+h02).

In the same manner, the pixels h13 and h23 are also obtained by performing the calculation h13=4×m1−(h10+h11+h12) or h23=4×m2−(h20+h21+h22).

Regarding pixel h33, the pixel m3 is obtained by the computing device 11 and computing device 12 as described above. Further, the pixel h33 is obtained by the computing device 13 and computing device 14 performing the calculations of the expression h33=4×m3−(h30+h31+h32).

In FIG. 2 and FIG. 3, the memory 1, computing devices 2 through 5 and 11 through 14 are formed upon a single chip such as, e.g., a CMOS (Complementary Metal Oxide Semiconductor), thereby realizing reduction in the size of the device and high-speed processing.

Although the description regarding FIG. 2 was made such wherein the computing devices 2 and 3 for performing the calculation for obtaining a pixel of the second hierarchy from the pixels of the first hierarchy, and the computing devices 4 and 5 for performing the calculation for obtaining a pixel of the third hierarchy from the pixels of the second hierarchy are provided separately, but the computing devices 2 and 4, and the computing devices 3 and 5 may be shared. This is also true for the computing devices 11 through 14 in FIG. 3.

Next, description will be made regarding the reading procedures of image data from the memory 1. In order to simplify the description, explanation will be made assuming that an upper hierarchy image is not created and the lowest hierarchy pixels are stored in the memory 1 without any change.

The pixel values comprising the lowest hierarchy are supplied to the memory 1 in the order of raster scanning. Reading and writing of the pixel values is performed in 4× 4 block units, as shown in FIG. 4.

Figure 4:
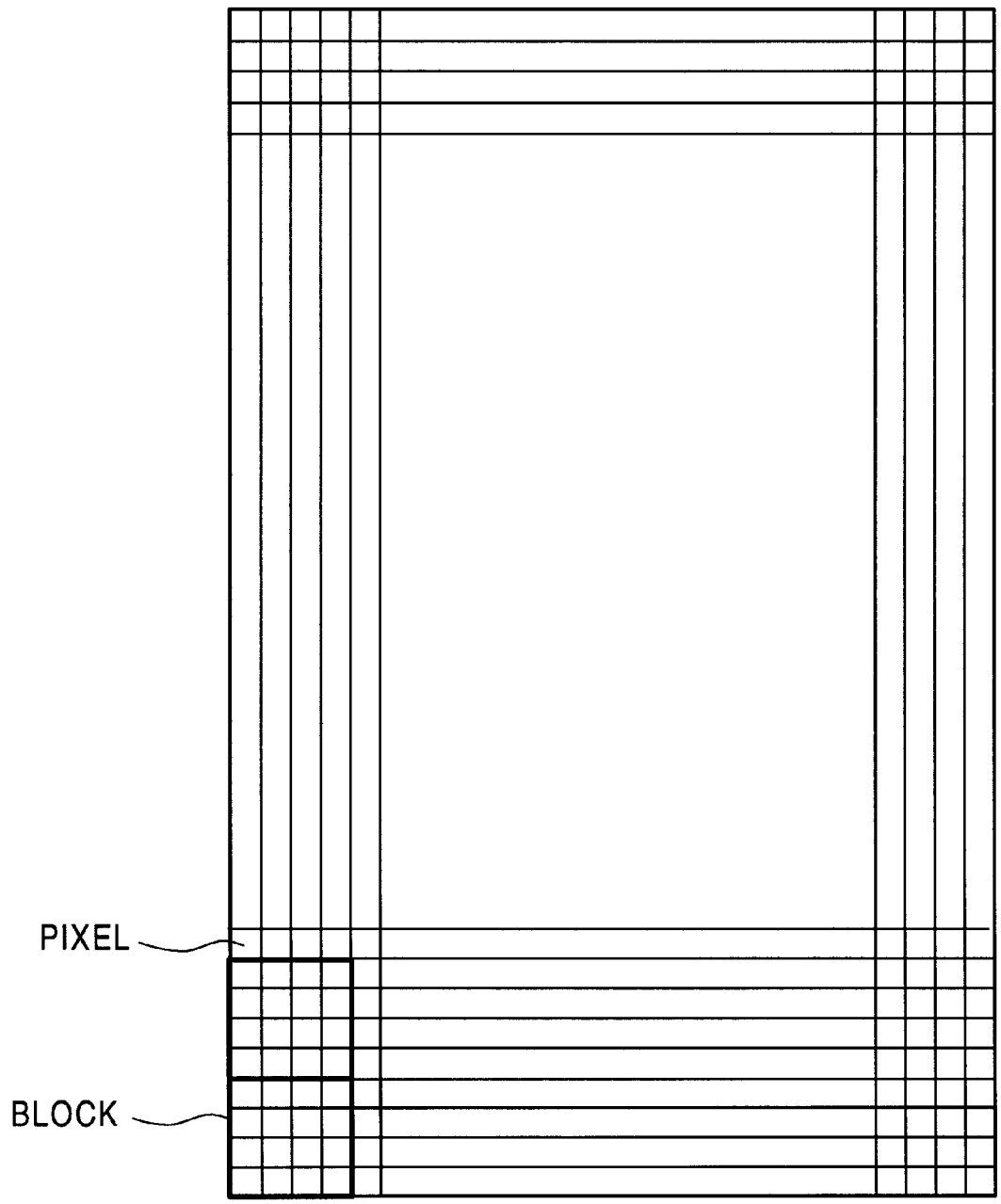
FIG. 4 is a diagram illustrating a block.
Figure 5:
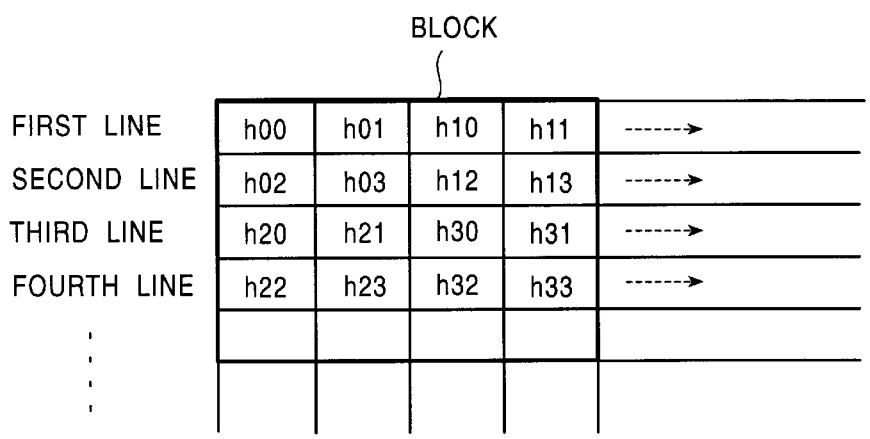
FIG. 5 is a enlarged partial view of FIG. 4.

As shown in FIG. 5 which is an enlargement of FIG. 4, at the timing at which the pixels h00, h01, h10, and h11 comprising the first line are supplied, the first four pixels h02, h03, h12, and h13 of the second line which form blocks with the first four pixels h00, h01, h10, and h11, the first four pixels h20, h21, h30, and h31 of the third line, and the first four pixels h22, h23, h32, and h33 of the fourth line, i.e., a total of 12 pixels, are not yet supplied. In other words, at the timing at which the pixels h00, h01, h10, and h11 comprising the first line are supplied, the 12 pixels which form blocks with the pixels h00, h01, h10, and h11 are not yet supplied. The memory 1 uses previous frame pixels stored in the memory 1 for the remaining 12 pixels, and thus 4×4 pixel blocks are formed. Regarding the first frame, the pixels of the previous frame is not yet stored in the memory 1, so certain fixed values are provided as dummy data for the remaining 12 pixels, thereby forming 4×4 pixel blocks.

At the timing at which the first four pixels h02, h03, h12, and h13 of the second line are supplied, the block to which the four pixels h02, h03, h12, and h13 should be a part of, i.e., the block comprised of the pixels h00, h01, h10, and h11 and the other 12 pixels, is read from the memory 1. The block regarding which the pixels h02, h03, h12, and h13 are positioned at the second line thereof, i.e., the block to which the pixels h00, h01, h10, and h11 are positioned as the first line and to which the pixels h02, h03, h12, and h13 are positioned as the second line, is formed and stored in memory 1.

At the timing at which the first four pixels h20, h21, h30, and h31 of the third line are supplied, processing similar to that with the second line is performed, and thus the block to which the pixels h00, h01, h10, and h11 are positioned as the first line, to which the pixels h02, h03, h12, and h13 are positioned as the second line, and to which the pixels h20, h21, h30, and h31 are positioned as the third line is formed and stored in memory 1.

At the timing at which the first four pixels h22, h23, h32, and h33 of the fourth line are supplied, processing similar to that with the second line is performed. Thus, the block to which the pixels h00, h01, h10, and h11 are positioned as the first line, to which the pixels h02, h03, h12, and h13 are positioned as the second line, to which the pixels h20, h21, h30, and h31 are positioned as the third line, and to which the pixels h22, h23, h32, and h33 are positioned as the fourth line is formed and stored in memory 1.

The writing of one block is completed upon four lines worth of pixels being supplied. With the number of pixels in the horizontal direction of the lowest hierarchy as e.g., 4×N (wherein N is a positive integer), N blocks are written by means of four lines of pixels being supplied.

Reading and writing of image data to the memory 1 is performed in units of blocks as described above, so in memory 1, absolute addresses are appropriated for each block.

In the present embodiment, the block essentially contains: the pixels h00 through h03, h10 through h13, h20 through h23, and h30 through h33, of the lowest hierarchy; the pixels m0 through m3 of the second hierarchy, and the pixel q of the highest hierarchy. While the pixels h03, h13, h23, h33, and m3 do not actually comprise the block, they can be calculated thereby, and thus will be considered to be essentially included. Accordingly, in the event that the block has been identified by an absolute address, the issue is to which hierarchy in the block that access is being requested.

Further, in the event that the hierarchy has been identified, the issue is to which pixel in the hierarchy that access is being requested.

Figure 6:
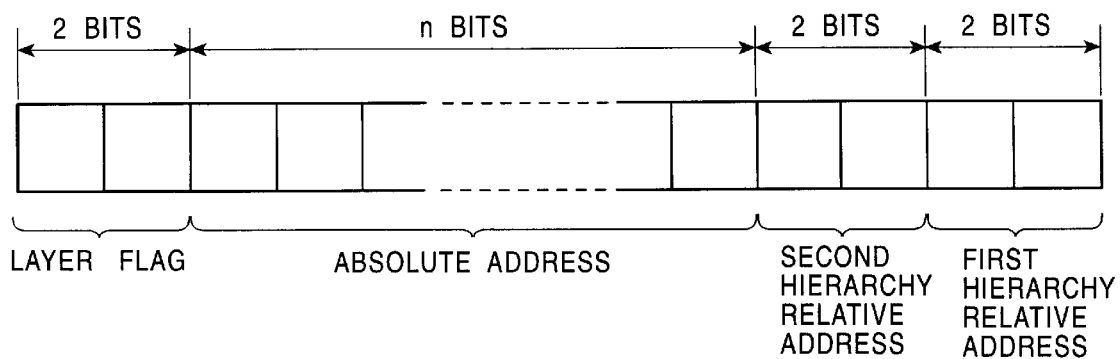
FIG. 6 is a diagram illustrating an address format.

The present embodiment uses a format shown in FIG. 6 as an address to access memory 1.

The address is comprised of, from the head thereof, a 2-bit layer flag, an n-bit absolute address, a 2-bit second hierarchy relative address, and a 2-bit first hierarchy relative address.

A value corresponding with the hierarchy of the first through third hierarchy to which access is going to be made is set to the layer flag. 00B, 01B, and 10B are respectively appropriated to the first through third hierarchies. "B" indicates that the preceding numerals are binary numbers.

The absolute address of the block to which access is to be made is positioned to the absolute address. The number of pixels in the highest hierarchy contained in the block (third hierarchy) is one, so the pixel of the highest hierarchy is identified by the absolute address. Accordingly, the absolute address is appropriated to the pixel of the highest hierarchy. With the number of bits to the absolute address as "n", there is the necessity for 2 to the n'th power to be equal to or less than the number of blocks comprising the first frame.

In the event that a pixel of the second hierarchy is to be accessed, the relative address appropriated to the second hierarchy is set to the second hierarchy relative address. Pixels m0 through m3 of the second hierarchy are appropriated with 00B through 11B.

In the event that a pixel of the first hierarchy is to be accessed, the relative address appropriated to the first hierarchy is set to the first hierarchy relative address. There are 16 pixels in the first hierarchy, namely, h00 through h03, h10 through h13, h20 through h23, and h30 through h33, wherein h00 through h03 correspond with pixel m0 of the second hierarchy, h10 through h13 with m1, h20 through h23 with m2, and h30 through h33 with m3, so which group out of h00 through h03, h10 through h13, h20 through h23, or h30 through h33 is to be accessed is determined by the second hierarchy relative address. A 2-bit value corresponding with the pixel which is to be accessed of the four pixels within the first hierarchy contained in a certain group is set to the first hierarchy relative address. For the group of h00 through h03, 00B through 11B are respectively appropriated to the upper left pixel h00, upper right pixel h01, lower left pixel h02, and lower right pixel h03. This is carried out in the same manner for the other groups, as well.

In the event that the pixel q of the highest hierarchy is to be accessed, the layer flag is set at 10B, and the absolute address is set at the absolute address appropriated to the pixel q. The second hierarchy relative address and the first hierarchy relative address are unnecessary, and thus ignored. The address may be comprised of the layer flag and absolute address alone.

In the event that the pixel m0 of the second hierarchy is to be accessed, the layer flag is set at 01B, and the absolute address is set at the absolute address appropriated to the pixel q. Further, the second hierarchy relative address is set to 00B which is the absolute address appropriated to the position of the pixel m0. The first hierarchy relative address is unnecessary, and thus is ignored or not used.

In the event that the pixel m3 of the second hierarchy is to be accessed, the layer flag is set at 01B, and the absolute address is set at the absolute address appropriated to the pixel q. Further, the second hierarchy relative address is set to 11B which is the absolute address appropriated to the position of the pixel m3. The first hierarchy relative address is unnecessary, and thus is ignored or not used.

In the event that such an address is specified when reading, the pixels q of the highest hierarchy and m0 through m2 of the second hierarchy are read from memory 1, thus obtaining pixel m3 of the second hierarchy. In the event that the second hierarchy relative address is 11B, the four memory cells storing q of the highest hierarchy and m0 through m2 of the second hierarchy are accessed.

In the event that the pixel h00 of the first hierarchy is to be accessed, the layer flag is set at 00B, and the absolute address is set at the absolute address appropriated to the pixel q. The second hierarchy relative address is set to 00B which is the absolute address appropriated to the position of the pixel m0 corresponding to the pixel h00, and the first hierarchy relative address is set to 00B which is the absolute address appropriated to the position of the pixel h00.

In the event that the pixel h03 of the first hierarchy is to be accessed, the layer flag is set at 00B, and the absolute address is set at the absolute address appropriated to the pixel q. The second hierarchy relative address is set to 00B which is the absolute address appropriated to the position of the pixel m0 corresponding to the pixel h03, and the first hierarchy relative address is set to 11B which is the absolute address appropriated to the position of the pixel h03.

In the event that such an address is specified when reading, the pixels m0 of the second hierarchy and h00 through h02 of the first hierarchy are read from memory 1, thus obtaining pixel h03 of the first hierarchy. In the event that the first hierarchy relative address is 11B, the four memory cells storing m0 of the second hierarchy and h00 through h02 of the first hierarchy used to created pixel m0 are accessed.

In the event that the pixel h33 of the first hierarchy is to be accessed, the layer flag is set at 00B, and the absolute address is set at the absolute address appropriated to the pixel q. The second hierarchy relative address is set to 11B which is appropriated to the position of the pixel m3 corresponding to the pixel h33, and the first hierarchy relative address is set to 11B which is appropriated to the position of the pixel h33.

In the event that such an address is specified when reading, the pixels q of the highest hierarchy and m0 through m2 of the second hierarchy are read, thus obtaining pixel m3 of the second hierarchy. The pixels h30 through 32 of the first hierarchy are read from the memory 1, thus obtaining pixel h33 of the first hierarchy using the already-obtained pixel m3.

In the case or reading the pixels of each hierarchy, an address such as described above must be specified, and all 16 memory cells comprising the block corresponding to pixel q can be each accessed by means of setting the layer flag at the time of writing to 00B which corresponds to the lowest hierarchy, the absolute address to the absolute address appropriated to the pixel q, and the first hierarchy relative address to 11B, whereby the second hierarchy relative address is set to 00B through 11B.

Figure 7:
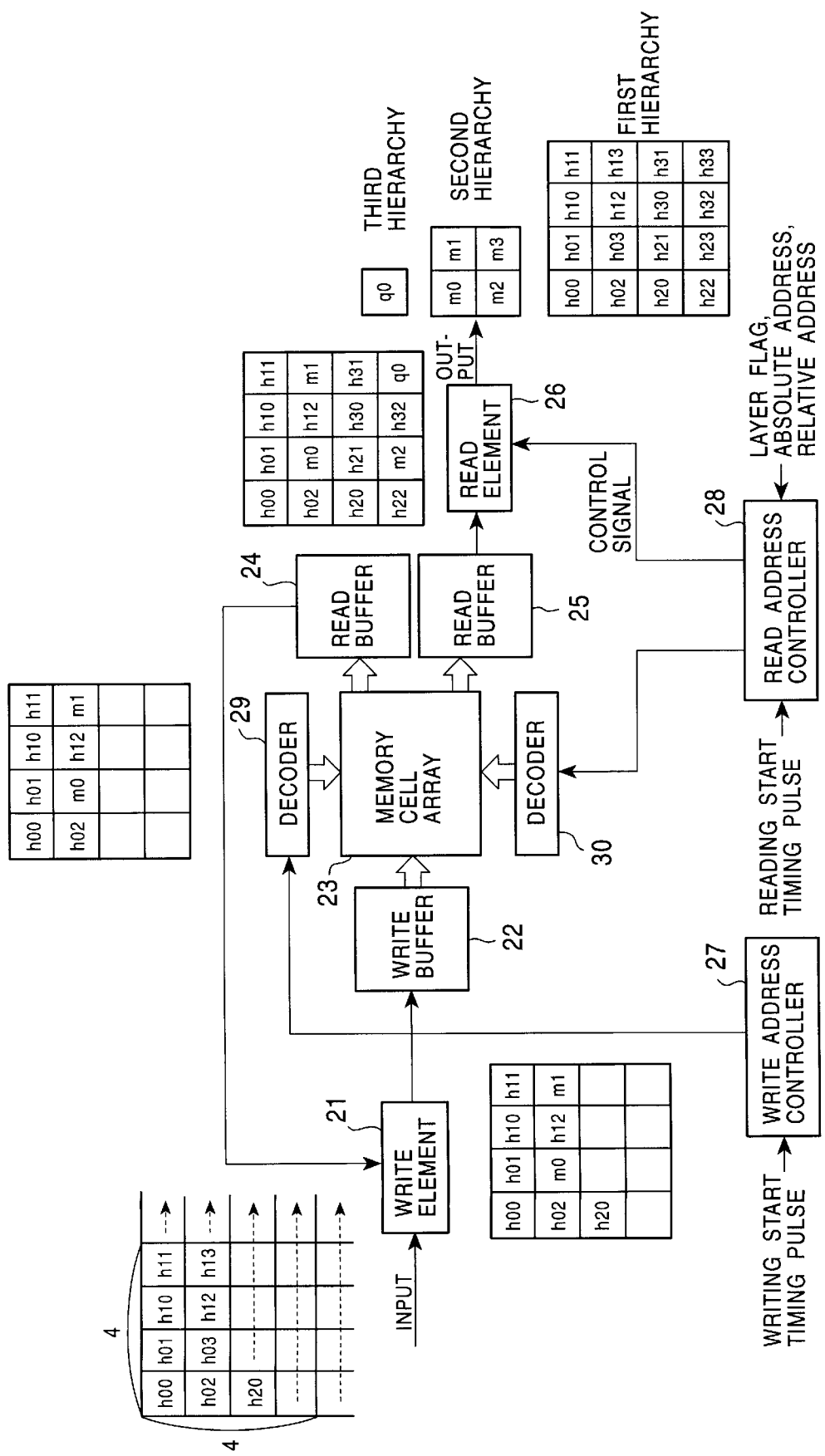
FIG. 7 is a block diagram illustrating an embodiment of a storage device to which the present invention has been applied.

Next, a more detailed example of construction of the storage device shown in FIG. 2 and FIG. 3 is illustrated in FIG. 7.

The configuration is such that pixel values of the pixels comprising the image to be subjected to hierarchical encoding are supplied to the write element 21 in the order of raster scanning, and at the same time, an image already stored in memory cell array 23 is supplied from the read buffer 24. In the right element 21, the pixels input thereto are used as lower hierarchy pixels for calculating upper hierarchy pixels, and the calculation results are supplied to the write buffer 22 in this configuration.

The write buffer 22 is comprised of the number of memory cells as the number of pixels comprising the block, and is configured such that pixels from the write element 21 are latched by units of blocks, so as to be supplied to the memory cell array 23.

The memory cell array 23 is comprised of memory cells arrayed in a lattice-work, capable of storing the pixels comprising at least one frame, and is configured so as to store pixels from the write buffer 22 to the memory cells corresponding to the write address supplied from the decoder 29. Also, memory cell array 23 is configured so as to read pixels stored in the memory cells corresponding to the read address supplied from the decoder 30, and supply these to the read buffer 24 or 25.

The read buffer 24 and 25 are comprised of the number of memory cells as the number of pixels comprising the block, and are configured such that pixels from the memory cell array 23 are latched by units of blocks. The pixels latched by the read buffer 24 are supplied to the write element 21, and the pixels latched by the read buffer 25 are supplied to the read element 26.

The read element 26 is configured such that the pixels h03, h13, h23, and h33 of the first hierarchy, and pixel m3 of the second hierarchy, not stored in the memory cell array 23, can be obtained by means of performing calculations using pixels from the read buffer 25. The read element 26 is supplied with control signals from the read address controller 28, and the read element 26 is configured so as to perform calculation based on these control signals.

The write address controller 27 generates write addresses for writing pixels in the unit of blocks into the memory cell array 23, these being supplied to the decoder 29. The write address controller 27 is comprised such that a write start timing pulse is supplied at the timing at which the pixel h00 at the head of the frame is supplied, and the write address controller 27 is comprised such that output of the write address is started based on the timing of the write start timing pulse being supplied.

The read address controller 28 generates read addresses for reading pixels in the unit of blocks from the memory cell array 23, these being supplied to the decoder 30. The read address controller 28 is comprised such that a read start timing pulse is supplied to notify starting of reading, and the read address controller 28 is comprised such that output of the read address is started based on the timing of the read start timing pulse being supplied. Also, the read address controller 28 is comprised such that the layer flag, absolute address, second hierarchy relative address, and first hierarchy relative address, for constructing the address as described with reference to FIG. 6, and the read address controller 28 is comprised such that the read address is constructed based on this address.

The decoders 29 or 30 are constructed such that the write address or read address from the write address controller 27 or read address controller 28 is decoded and supplied to the memory cell array 23.

The circuit shown in FIG. 7 is formed on a single chip. The write element 21 corresponds with the computing devices 2 through 5 shown in FIG. 2, the read element 26 corresponds with the computing devices 11 through 14 shown in FIG. 3, and the memory cell array 23 corresponds with the memory 1 shown in FIG. 2 and FIG. 3.

Further description shall be made regarding the construction of the write element 21 and write buffer 22.

Figure 8:
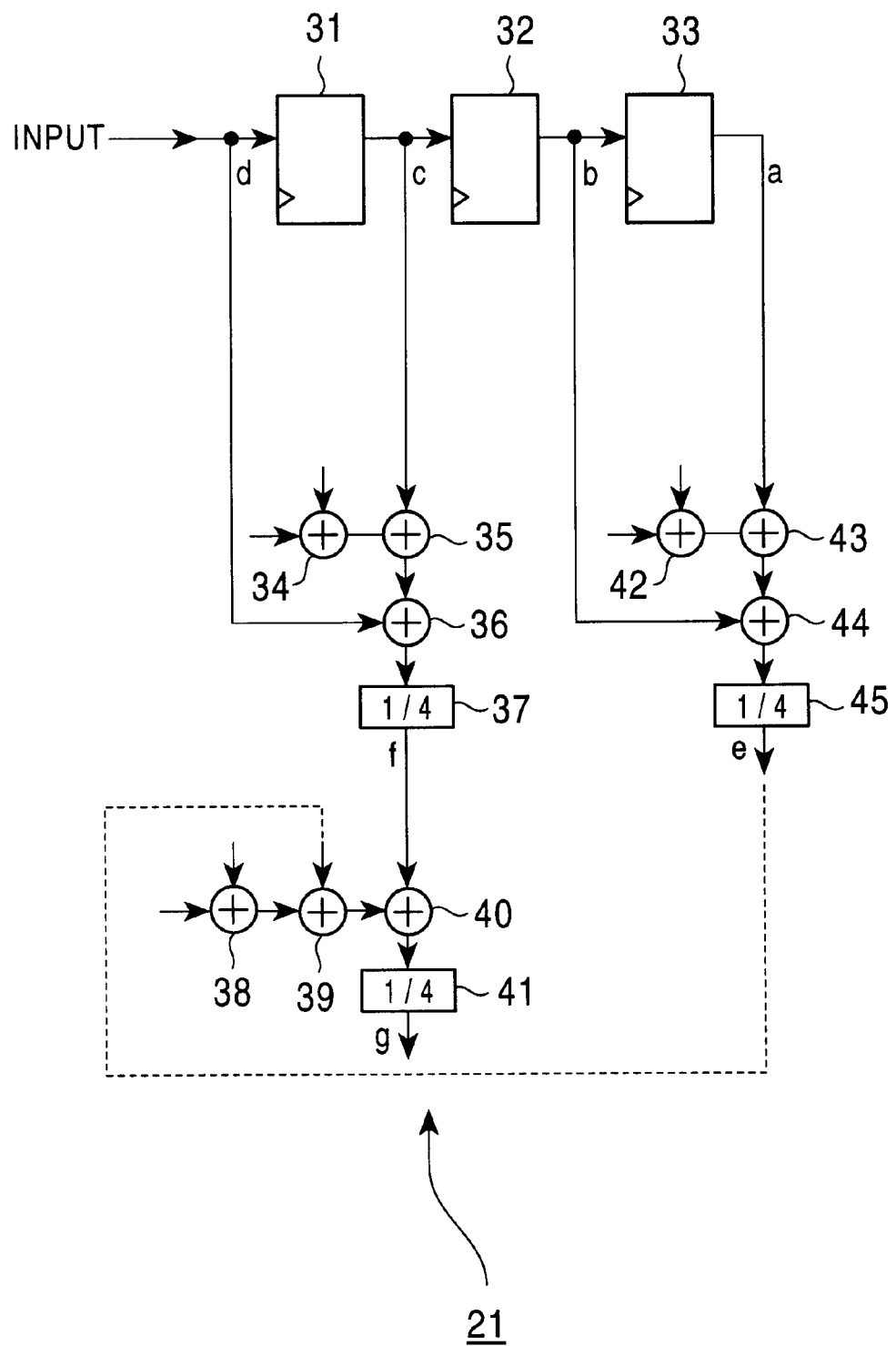
FIG. 8 is a diagram illustrating a configuration example of the write element 21 shown in FIG. 7.

FIG. 8 shows a constructional example of the write element 21 shown in FIG. 7.

The arrangement is such that the pixels to be supplied in the order of raster scanning are supplied to the latch circuit 31 and computing device 36. The latch circuit 31 is configured such that the pixels supplied thereto are latched, and supplied to the latch circuit 32 and computing device 35. The latch circuit 32 is configured such that the pixels supplied thereto are latched, and supplied to the latch circuit 33 and computing device 44. The latch circuit 33 is configured such that the pixels from the latch circuit 32 are latched, and supplied to the computing device 43.

The computing device 34 is configured such that two of the pixels read from the read buffer 24 are supplied as necessary. The computing device 34 is configured such that the two pixels supplied to the computing device 34 are added, and the addition results are supplied to the computing device 35. The computing device 35 is configured such that the output of the computing device 34 and the output of the latch circuit 31 are added, and supplied to the computing device 36. The computing device 36 is configured such that the pixels supplied in order of raster scanning and the output of the computing device 35 are added, and supplied to the computing device 37. The computing device 37 is configured such that the output of the computing device 36 is divided by 4 by means of being shifted 2 bits to the right, the division results thereof being supplied to the computing device 40.

The computing device 38 is configured such that two of the pixels read from the read buffer 24 are supplied as necessary. The computing device 38 is configured such that the two pixels supplied to the computing device 38 are added, and the addition results are supplied to the computing device 39. The computing device 39 is configured such that the output of the computing device 38 is supplied, and also the output of the computing device 45 is supplied as necessary, and the output of the computing device 38 and computing device 45 are added, and supplied to the computing device 40. The computing device 40 is configured such that the output of the computing device 37 and computing device 39 are added, and supplied to the computing device 41. The computing device 41 is configured in the same manner as the computing device 37 such that the output of the computing device 40 is divided by 4 by means of being shifted 2 bits to the right, the division results thereof being output.

The computing device 42 is configured such that two of the pixels read from the read buffer 24 are supplied as necessary. The computing device 42 is configured such that the two pixels supplied to the computing device 42 are added, and the addition results are supplied to the computing device 43. The computing device 43 is configured such that the output of the computing device 42 and the output of the latch circuit 33 are added, and supplied to the computing device 44. The computing device 44 is configured such that the output of the computing device 43 and the output of the latch circuit 32 are added, and supplied to the computing device 45. The computing device 45 is configured in the same manner as the computing device 37 such that the output of the computing device 44 is divided by 4 by means of being shifted 2 bits to the right, the division results thereof being supplied to the computing device 40.

Figure 9:
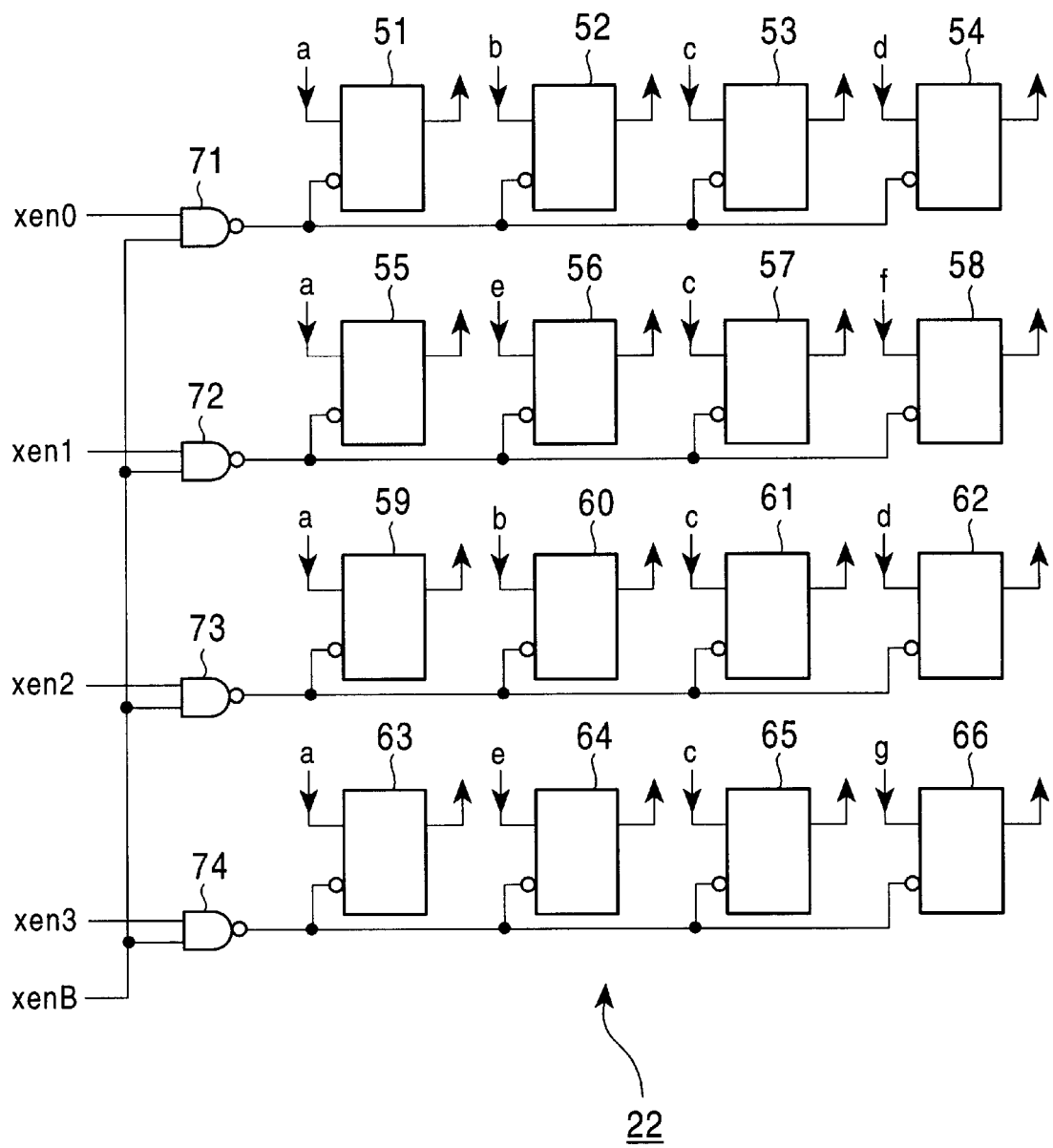
FIG. 9 is a diagram illustrating a configuration example of the write buffer 22 shown in FIG. 7.

FIG. 9 illustrates a configuration example of the write buffer 22 shown in FIG. 7.

As shown in FIG. 9, the write buffer 22 is configured of 16 cells 51 through 66 for storing pixels in the unit of blocks, and NAND gates 71 through 74 for providing clock for latching pixels to the cells 51 through 66.

The cells 51 through 66 are arrayed in a 4×4 lattice-work, and each of the cells 51 through 54, 55 through 58, 59 through 62, and 63 through 66 are configured such that clock signals are supplied thereto from the respective NAND gates 71 through 74. The cells 51 through 66 are configured such that the pixels supplied from the write element 21 are latched, and supplied to the memory cell array 23. The write buffer 22 has 16 cells 51 through 66 arrayed in a 4×4 lattice-work, and hence pixel writing is performed in the unit of blocks.

One end of the NAND gates 71 through 74 is configured such that clock xenb is supplied thereto, and the other end thereof is configured such that mask signals xen0 through xen3 for masking the clock xen3 to the cells 51 through 54, 55 through 58, 59 through 62, and 63 through 66. The mask signals xen0 through xen3 become High level regarding the cells 51 through 54, 55 through 58, 59 through 62, and 63 through 66, at the timing of latching the pixels from the write element 21, and are Low level at other times. Accordingly, xenB is supplied to each of the cells 51 through 54, 55 through 58, 59 through 62, and 63 through 66, at the timing of latching the pixels from the write element 21 to the cells 51 through 54, 55 through 58, 59 through 62, and 63 through 66, and at other times, the clock xenB is masked.

The portions denoted by the letters "a" through "f" in the block diagram regarding the write element 21 shown in FIG. 8 are connected to the portions in the block diagram regarding the write element 22 shown in FIG. 9 denoted by the same letters. Regarding the first row of cells 51, 55, 59 and 63 of the write buffer 22, the output of the latch circuit 33 of the write element 21 is latched. Regarding the cell 66 to the lower right of the write buffer 22, the output of the computing device 41 of the write element 21 is latched. Regarding the first row of cells 51 through 54 of the write buffer 22, the output of the latch circuits 33, 32, and 31, and the input to the latch circuit 31 are latched.

The operation of the storage device shown in FIG. 7 at the time of writing will now be described.

At the time of supplying the pixels h00, h01, h10, and h11 of the first line of the lowest hierarchy, the pixels h00, h01, h10, and h11 are sequentially latched by the latch circuits 31 through 33 of the write element 21. That is, at the timing at which the pixel h11 is supplied to the latch circuit 31, the pixels h10, h01, and h00 are respectively latched to the latch circuits 31 through 33, and the cells 51 through 54 comprising the first line of the write buffer 22 are in an enabled state, i.e., a state in which clock xenB is output from the NAND gate 71 and data can be latched.

The cells 51 through 54 latch the pixels h00, h01, h10, and h11.

The first four pixels h02, h03, h12, and h13 of the second line which form blocks with the pixels h00, h01, h10, and h11, the first four pixels h20, h21, h30, and h31 of the third line, and the first four pixels h22, h23, h32, and h33 of the fourth line, i.e., a total of 12 pixels, are not yet supplied. Accordingly, pixels C of the previous frame are written to the cells 55 through 58, 59 through 62, and 63 through 66 of the second through fourth lines of the write buffer 22.

The 4×4 data thus stored in the cells 51 through 66 is supplied to the memory cell array 23, and is stored to 4×4 memory cells appropriated to the corresponding absolute address.

Figure 10:
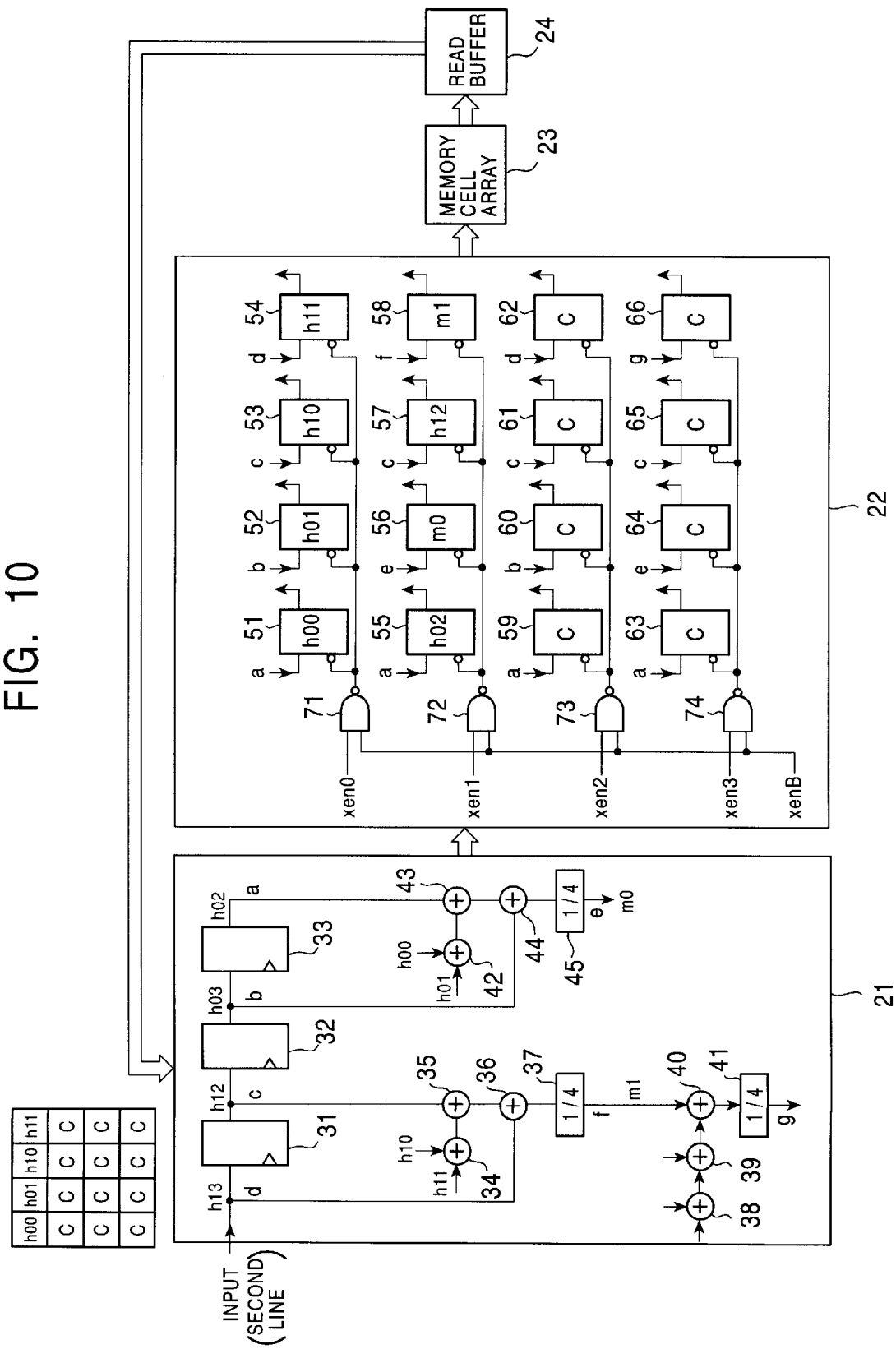
FIG. 10 is a first diagram describing the writing operation of the storage device shown in FIG. 7.

At the time at which the first four pixels h02, h03, h12, and h13 of the second line are supplied, these are sequentially latched to the latch circuits 31 through 33 of the write element 21. At the timing at which the pixel h13 is supplied, i.e., at the timing at which the pixel h13 is supplied to the latch circuit 31, the pixels h12, h03, and h02 are latched by the respective latch circuits 31 through 33, as shown in FIG. 10.

The block storing pixels h00, h01, h10, and h11 in the first line, and the pixels C of the previous frame to the second through fourth line is read, and stored in the read buffer 24. This block is supplied from the read buffer 24 to the write element 21, as shown in FIG. 10.

In the write element 21, the pixels h00 and h01 from the read buffer 24 are supplied to the computing device 42. At the computing device 42, the pixels h00 and h01 are added, and the added value thereof (h00+h01) is output to the computing device 43. At the computing device 43, the added value from the computing device 42 and the pixel h02 which is the output of the latch circuit 33 are added, and the added value thereof (h00+h01+h02) is output to the computing device 44. At the computing device 44, the added value from the computing device 43 and the pixel h03 which is the output of the latch circuit 32 are added, and the added value thereof (h00+h01+h02+h03) is output to the computing device 45. At the computing device 45, the added value from the computing device 44 is divided by 4, thereby obtaining the second hierarchy pixel m0 (=(h00+h01+h02+h03)/4).

The pixels h10 and h11 from the read buffer 24 are supplied to the computing device 34. At the computing device 34, the pixels h10 and h11 are added, and the added value thereof (h10+h11) is output to the computing device 35. At the computing device 35, the added value from the computing device 34 and the pixel h12 which is the output of the latch circuit 31 are added, and the added value thereof (h10+h11+h12) is output to the computing device 36. At the computing device 36, the added value from the computing device 35 and the pixel h13 which is the output of the latch circuit 31 are added, and the added value thereof (h10+h11+h12+h13) is output to the computing device 37. At the computing device 37, the added value from the computing device 36 is divided by 4, thereby obtaining the second hierarchy pixel m1 (=(h10+h11+h12+h13)/4).

The pixels h00, h01, h10, and h11 of the first line from the read buffer 24 are respectively supplied to the cells 51 through 54 of the first line of the write buffer 22 by the write element 21, and the cells 51 through 54 enter into an enabled state at this timing. As shown in FIG. 10, the cells 51 through 54 latch the pixels h00, h01, h10, and h11 once more.

At the write buffer 22, the cells 55 through 58 are placed in an enabled state. As shown in FIG. 10, the pixel h02 output from the latch circuit 33 is latched to cell 55, the pixel m0 output from the computing device 45 is latched to cell 56, the pixel h12 output from the latch circuit 31 is latched to cell 57, and the pixel m1 output from the computing device 37 is latched to cell 58.

The first four pixels h20, h21, h30, and h31 of the third line, and the first four pixels h22, h23, h32, and h33 of the fourth line, which form blocks with the pixels h00, h01, h10, and h11 of the first line and the pixels h02, m0, h12, and m1 of the second line, i.e., a total of 8 pixels, are not yet supplied. Accordingly, pixels C of the previous frame are written to the cells 59 through 62 and 63 through 66 of the third and fourth lines of the write buffer 22.

The 4×4 data thus stored in the cells 51 through 66 is supplied to the memory cell array 23, and is overwritten to 4×4 memory cells appropriated to the corresponding absolute address.

Figure 11:
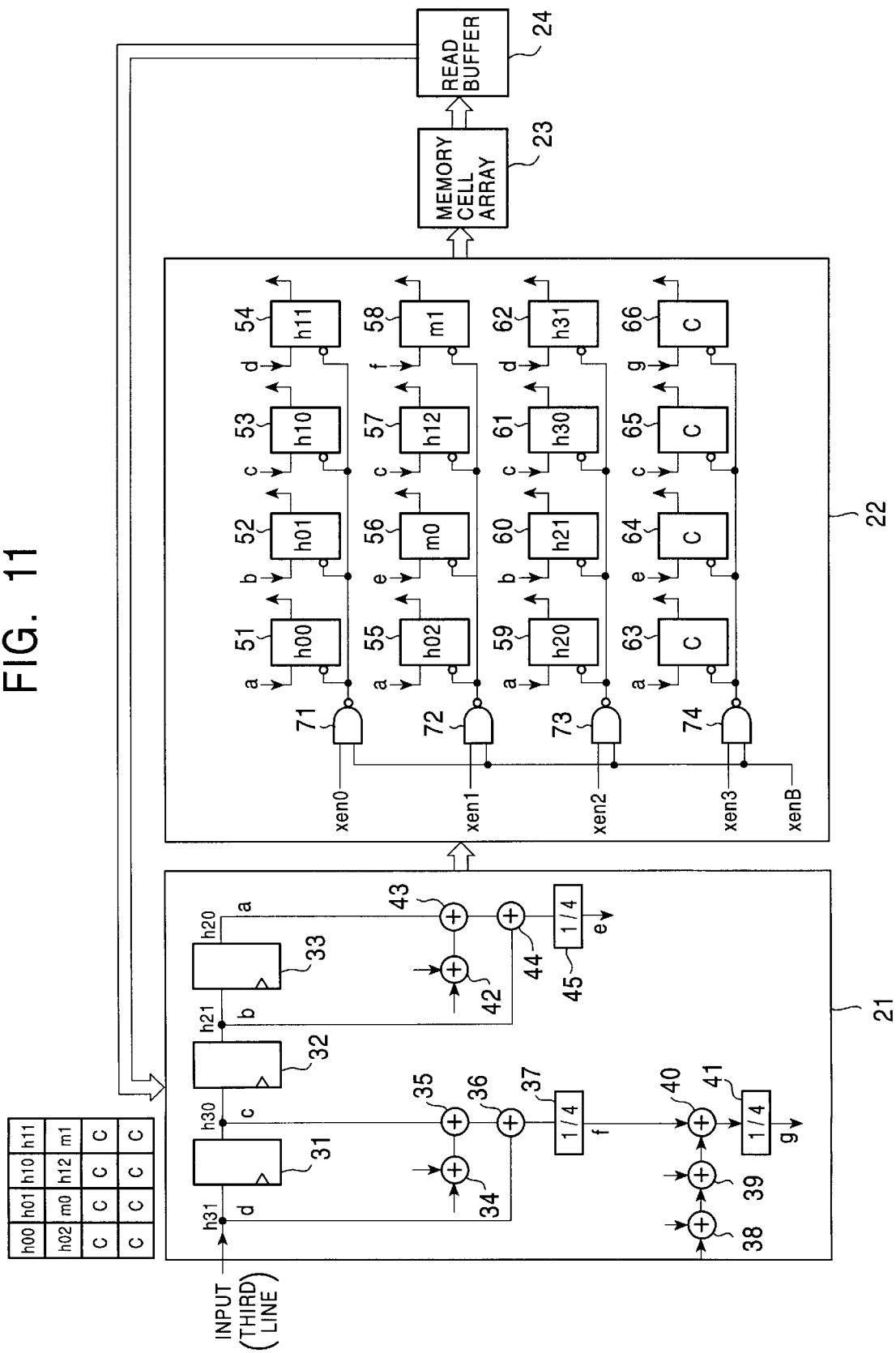
FIG. 11 is a second diagram describing the writing operation of the storage device shown in FIG. 7.

At the time at which the first four pixels h20, h21, h30, and h31 of the third line of the lowest hierarchy are supplied, the pixels h20, h21, h30, and h31 are sequentially latched to the latch circuits 31 through 33 of the write element 21. At the timing at which the pixel h31 is supplied, i.e., at the timing at which the pixel h13 is supplied to the latch circuit 31, the pixels h30, h21, and h20 are latched by the respective latch circuits 31 through 33, as shown in FIG. 11.

From the memory cell array 23, the pixels h00, h01, h10, and h11 are stored to the first line and the pixels h02, m0, h12, and m1 are stored to the second line, the block storing the pixels C of the previous frame is read to the third and fourth lines, and stored in the read buffer 24. This block is supplied from the read buffer 24 to the write element 21.

The pixels h00, h01, h10, and h11 of the first line from the read buffer 24 are respectively supplied to the cells 51 through 54 of the first line of the write buffer 22 by the write element 21, and the cells 51 through 54 enter into an enabled state at this timing. As shown in FIG. 11, the cells 51 through 54 latch the respective pixels h00, h01, h10, and h11 once more.

The pixels h02, m0, h12, and m1 of the second line from the read buffer 24 are respectively supplied to the cells 55 through 58 of the second line of the write buffer 22 by the write element 21, and the cells 55 through 58 enter into an enabled state at this timing. As shown in FIG. 11, the cells 55 through 58 latch the respective pixels h02, m0, h12, and m1 once more.

At the write buffer 22, the cells 59 through 62 are placed in an enabled state. As shown in FIG. 11, the pixel h20 output from the latch circuit 33 is latched to cell 59, the pixel h21 output from the latch circuit 32 is latched to cell 60, the pixel h30 output from the latch circuit 31 is latched to cell 61, and the pixel h31 supplied to the latch circuit 31 is latched to cell 62.

The first four pixels h22, h23, h32, and h33 of the fourth line, which form blocks with the pixels h00, h01, h10, and h11 of the first line, the pixels h02, m0, h12, and m1 of the second line, and the pixels h20, h21, h30, and h31 of the third line, are not yet supplied. Accordingly, pixels C of the previous frame are written to the cells 63 through 66 of the fourth line of the write buffer 22.

The 4×4 data thus stored in the cells 51 through 66 is supplied to the memory cell array 23, and is stored.

Figure 12:
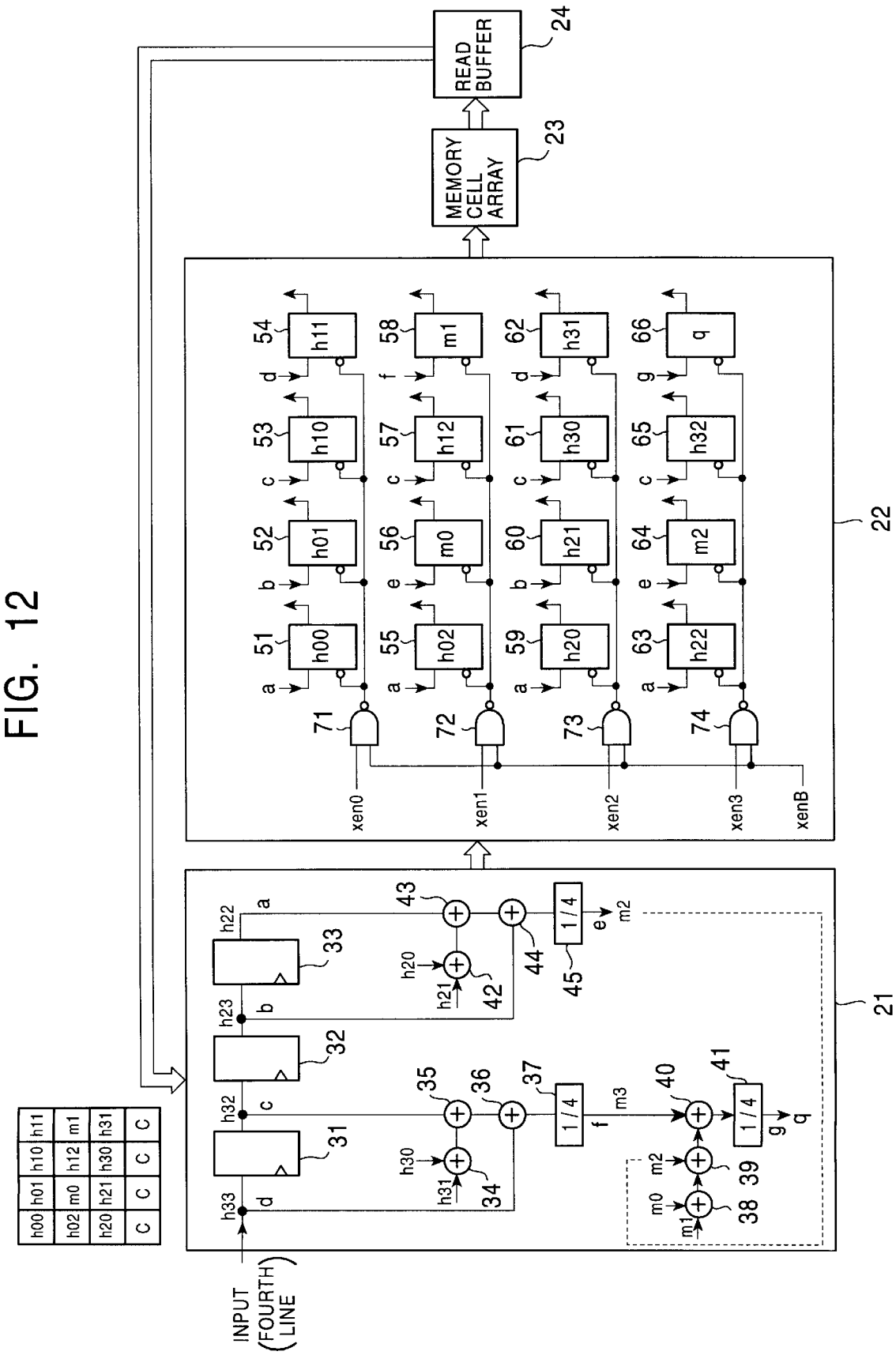
FIG. 12 is a third diagram describing the writing operation of the storage device shown in FIG. 7.

At the time at which the first four pixels h22, h23, h32, and h33 of the fourth line of the lowest hierarchy are supplied, the pixels h22, h23, h32, and h33 are sequentially latched to the latch circuits 31 through 33 of the write element 21. At the timing at which the pixel h33 is supplied, i.e., at the timing at which the pixel h33 is supplied to the latch circuit 31, the pixels h32, h23, and h22 are latched by the respective latch circuits 31 through 33, as shown in FIG. 12.

From the memory cell array 23, the pixels h00, h01, h10, and h11 are stored to the first line, the pixels h02, m0, h12, and m1 are stored to the second line, the pixels h20, h21, h30, and h31 are stored to the third line, the block storing the pixels C of the previous frame is read to the fourth line, and stored in the read buffer 24. This block is supplied from the read buffer 24 to the write element 21, as shown in FIG. 12.

In the write element 21, the pixels h20 and h21 from the read buffer 24 are supplied to the computing device 42. At the computing device 42, the pixels h20 and h21 are added, and the added value thereof (h20+h21) is output to the computing device 43. At the computing device 43, the added value from the computing device 42 and the pixel h22 which is the output of the latch circuit 33 are added, and the added value thereof (h20+h21+h22) is output to the computing device 44. At the computing device 44, the added value from the computing device 43 and the pixel h23 which is the output of the latch circuit 32 are added, and the added value thereof (h20+h21+h22+h23) is output to the computing device 45. At the computing device 45, the added value from the computing device 44 is divided by 4, thereby obtaining the second hierarchy pixel m2 (=(h20+h21+h22+h23)/4).

The pixels h30 and h31 from the read buffer 24 are supplied to the computing device 34. At the computing device 34, the pixels h30 and h31 are added, and the added value thereof (h30+h31) is output to the computing device 35. At the computing device 35, the added value from the computing device 34 and the pixel h32 which is the output of the latch circuit 31 are added, and the added value thereof (h30+h31+h32) is output to the computing device 36. At the computing device 36, the added value from the computing device 35 and the pixel h33 which is the output of the latch circuit 31 are added, and the added value thereof (h30+h31+h32+h33) is output to the computing device 37. At the computing device 37, the added value from the computing device 36 is divided by 4, thereby obtaining the second hierarchy pixel m3 (=(h30+h31+h32+h33)/4). The pixel m3 is supplied to the computing device 40.

The pixels m0 and m1 from the read buffer 24 are supplied to the computing device 38. At the computing device 38, the pixels m0 and m1 are added, and the added value thereof (m0+m1) is output to the computing device 39. At the computing device 39, the added value from the computing device 39 and the pixel m2 which is the output of the computing device 45 are added, and the added value thereof (m0+m1+m2) is output to the computing device 40. At the computing device 40, the added value from the computing device 39 and the pixel m3 from the computing device 37 are added, and the added value thereof (m0+m1+m2+m3) is output to the computing device 41. At the computing device 41, the added value from the computing device 40 is divided by 4, thereby obtaining the third hierarchy pixel q (=(m0+m1+m2+m3)/4).

The pixels h00, h01, h10, and h11 of the first line from the read buffer 24 are respectively supplied to the cells 51 through 54 of the first line of the write buffer 22 by the write element 21, and the cells 51 through 54 enter into an enabled state at this timing. As shown in FIG. 12, the cells 51 through 54 latch the respective pixels h00, h01, h10, and h11 once more.

The pixels h02, m0, h12, and m1 of the second line from the read buffer 24 are respectively supplied to the cells 55 through 58 of the second line of the write buffer 22 by the write element 21, and the cells 55 through 58 enter into an enabled state at this timing. As shown in FIG. 12, the cells 51 through 54 latch the respective pixels h02, m0, h12, and m1 once more.

The pixels h20, h21, h30, and h31 of the first line from the read buffer 24 are respectively supplied to the cells 59 through 62 of the third line of the write buffer 22 by the write element 21, and the cells 59 through 62 enter into an enabled state at this timing. As shown in FIG. 12, the cells 59 through 62 latch the respective pixels h20, h21, h30, and h31 once more.

At the write buffer 22, the cells 63 through 66 are placed in an enabled state. As shown in FIG. 12, the pixel h22 output from the latch circuit 33 is latched to cell 63, the pixel m2 output from the computing device 45 is latched to cell 64, the pixel h32 output from the latch circuit 31 is latched to cell 65, and the pixel q output from the computing device 41 is latched to cell 66.

The 4x4 data thus stored in the cells 51 through 66 is supplied to the memory cell array 23, and is overwritten to 4x4 memory cells appropriated to the corresponding absolute address.

In this way, pixels are written to the memory cell array 23 in units of blocks.

Incidentally, the same processing is performed for the other blocks of the first through fourth lines of the lowest hierarchy, and also the same processing is performed for the fifth and subsequent lines.

Figure 13:
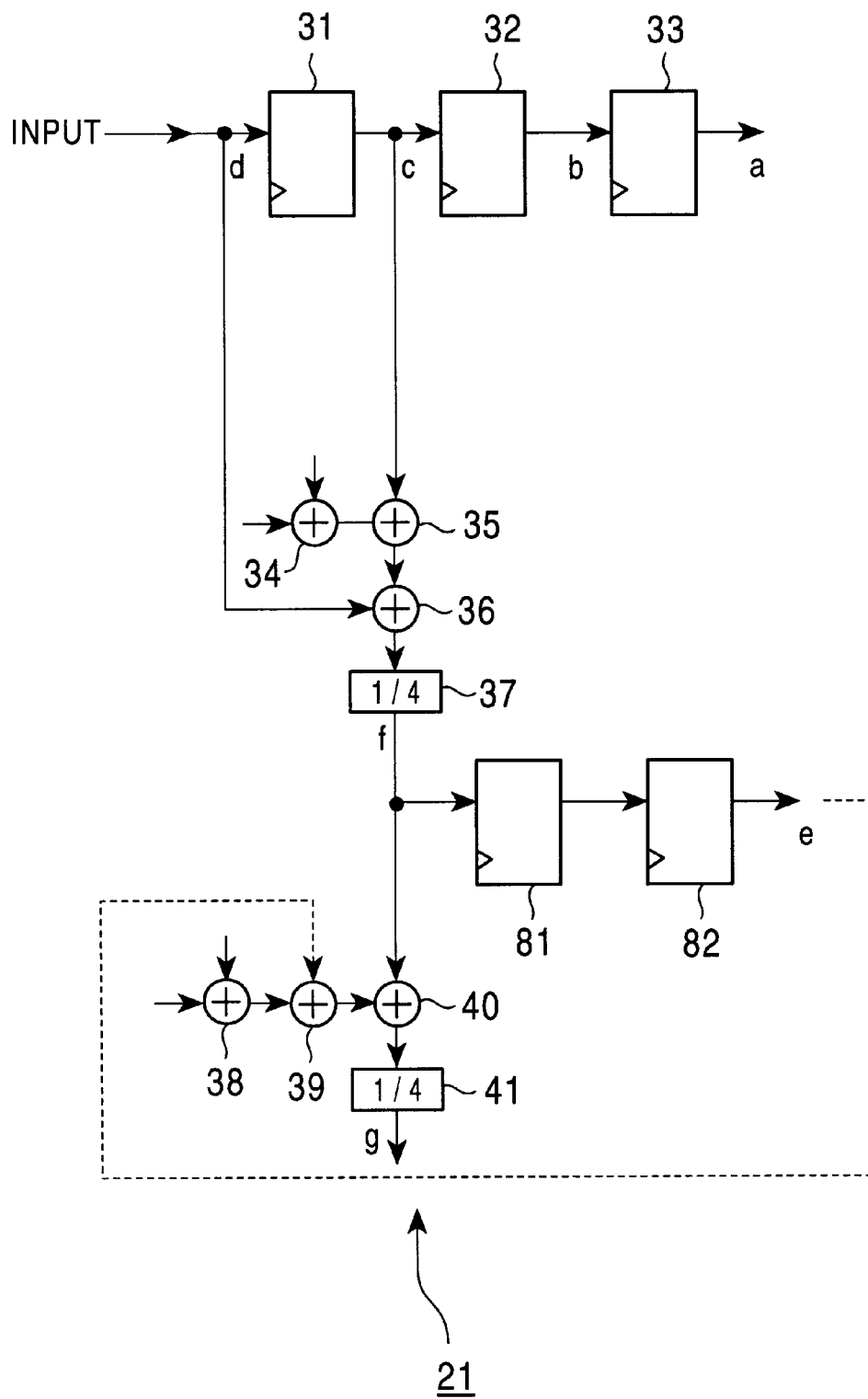
FIG. 13 is a diagram illustrating another configuration example of the write element 21 shown in FIG. 7.

FIG. 13 shows another construction example of the write element 21 shown in FIG. 7. In the Figure, the portions which correspond with those in FIG. 8 are provided with the same reference numerals and characters. This write element 21 is basically of the same construction as that shown in FIG. 8, except that the computing devices 42 and 45 have been removed, and latch circuits 81 and 82 for latching the output of computing device 37 has been newly provided. The configuration is such that the output of the latch circuit 82 may be provided to the computing device 39 instead of the output of the computing device 45, if necessary.

The writing of the first line and third line at the write element 21 is performed in the same manner as that of FIG. 8.

Figure 14:
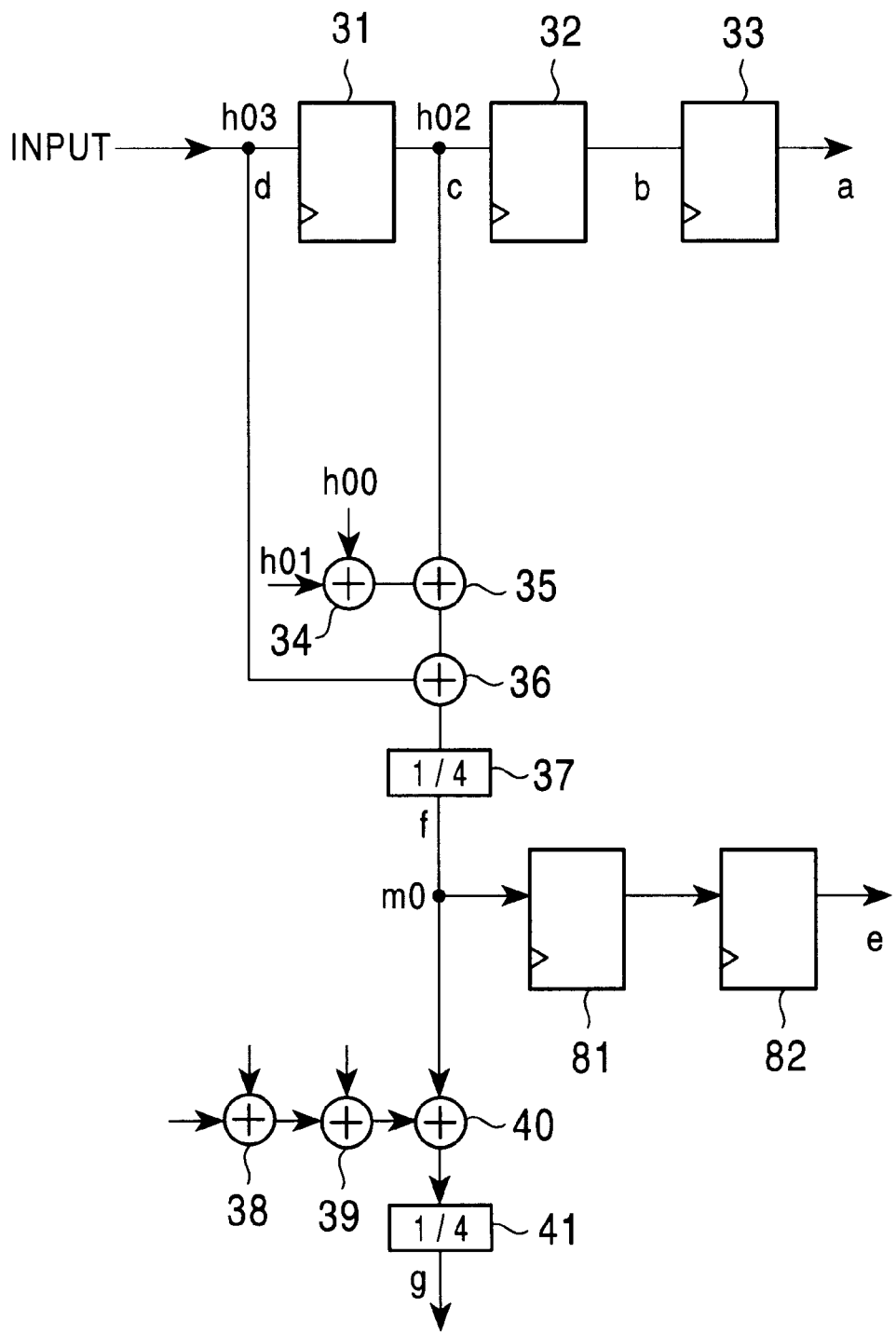
FIG. 14 is a first diagram describing the operation of the write element 21 shown in FIG. 13.

When writing the second line, as shown in FIG. 14, the pixel h02 of the second line of the lowest hierarchy is latched by the latch circuit 31, the pixels h00, h01, h10, and h11 are stored via the memory cell array 23 at the timing at which the next pixel h03 is latched to the latch circuit 31, and the block storing the pixels C of the previous frame is supplied to the second through fourth lines.

At the write element 21, as shown in FIG. 14, the pixels h00 and h01 are supplied from the read buffer 24 to the computing device 34. With the computing devices 34 and 37 in the same manner as described above, the second hierarchy pixel m0 (=(h00+h01+h02+h03)/4) is obtained.

Figure 15:
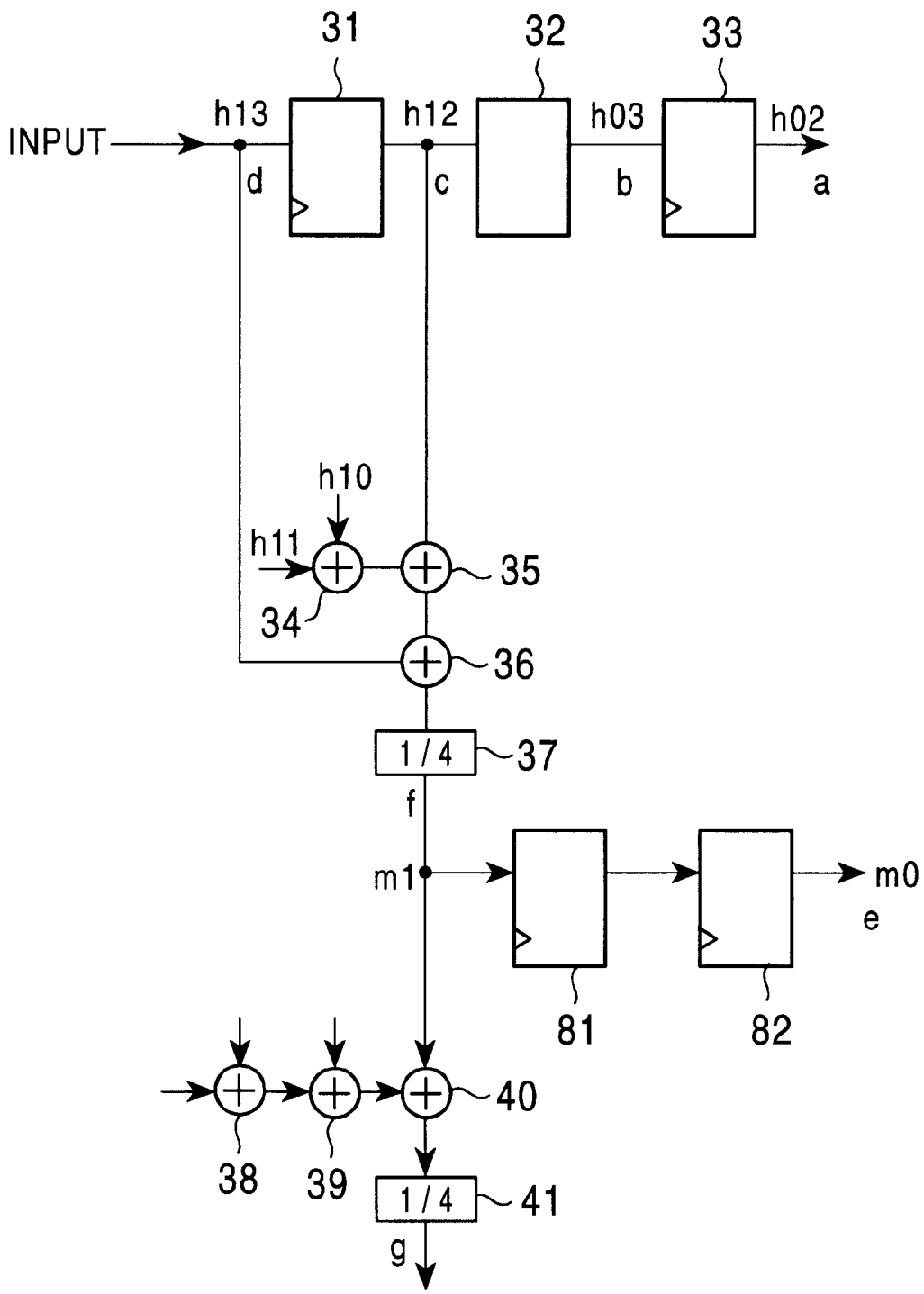
FIG. 15 is a second diagram describing the operation of the write element 21 shown in FIG. 13.

As shown in FIG. 15, in the latch circuits 31 through 33, the pixels h12, h03, and h02 of the second line of the lowest hierarchy are each latched, and when the pixel h13 is supplied to the latch circuit 31, the pixels h10 and h11 from the read buffer 24 are supplied to the computing device 34. Then, with the computing devices 34 and 37 in the same manner as described above, the second hierarchy pixel m1 (=(h10+h11+h12+h13)/4) is obtained.

The pixel m0 of the second hierarchy output earlier from the computing device 37 is sequentially latched by the latch circuits 81 and 82 and output.

Each of the pixels output by the write element 21 is latched by the write buffer 22 in the same manner as the case shown in FIG. 8, and written to the memory cell array 23.

Figure 16:
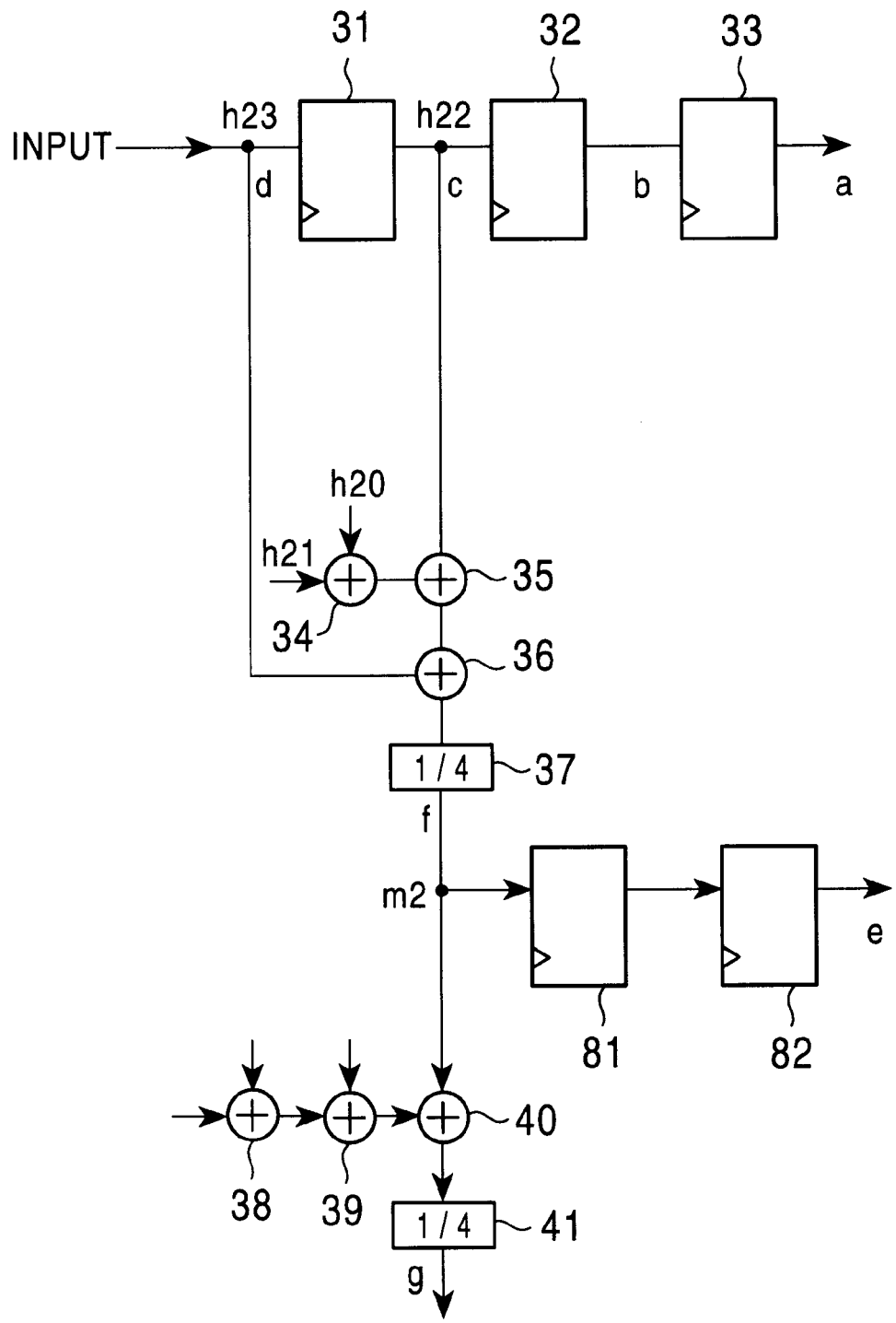
FIG. 16 is a third diagram describing the operation of the write element 21 shown in FIG. 13.

When writing the fourth line, as shown in FIG. 16, the pixel h22 of the fourth line of the lowest hierarchy is latched by the latch circuit 31, the pixels h00, h01, h10, and h11 are stored to the first line, the pixels h02, m0, h12, and m1 are stored to the second line, and the pixels h20, h21, h30, and h31 are stored to the third line, via the memory cell array 23 at the timing at which the next pixel h23 is latched to the latch circuit 32, and the block storing the pixels C of the previous frame is supplied to the fourth line.

At the write element 21, as shown in FIG. 16, the pixels h20 and h21 are supplied from the read buffer 24 to the computing device 34. With the computing devices 34 through 37 in the same manner as described above, the second hierarchy pixel m2 (=(h20+h21+h22+h23)/4) is obtained.

Figure 17:
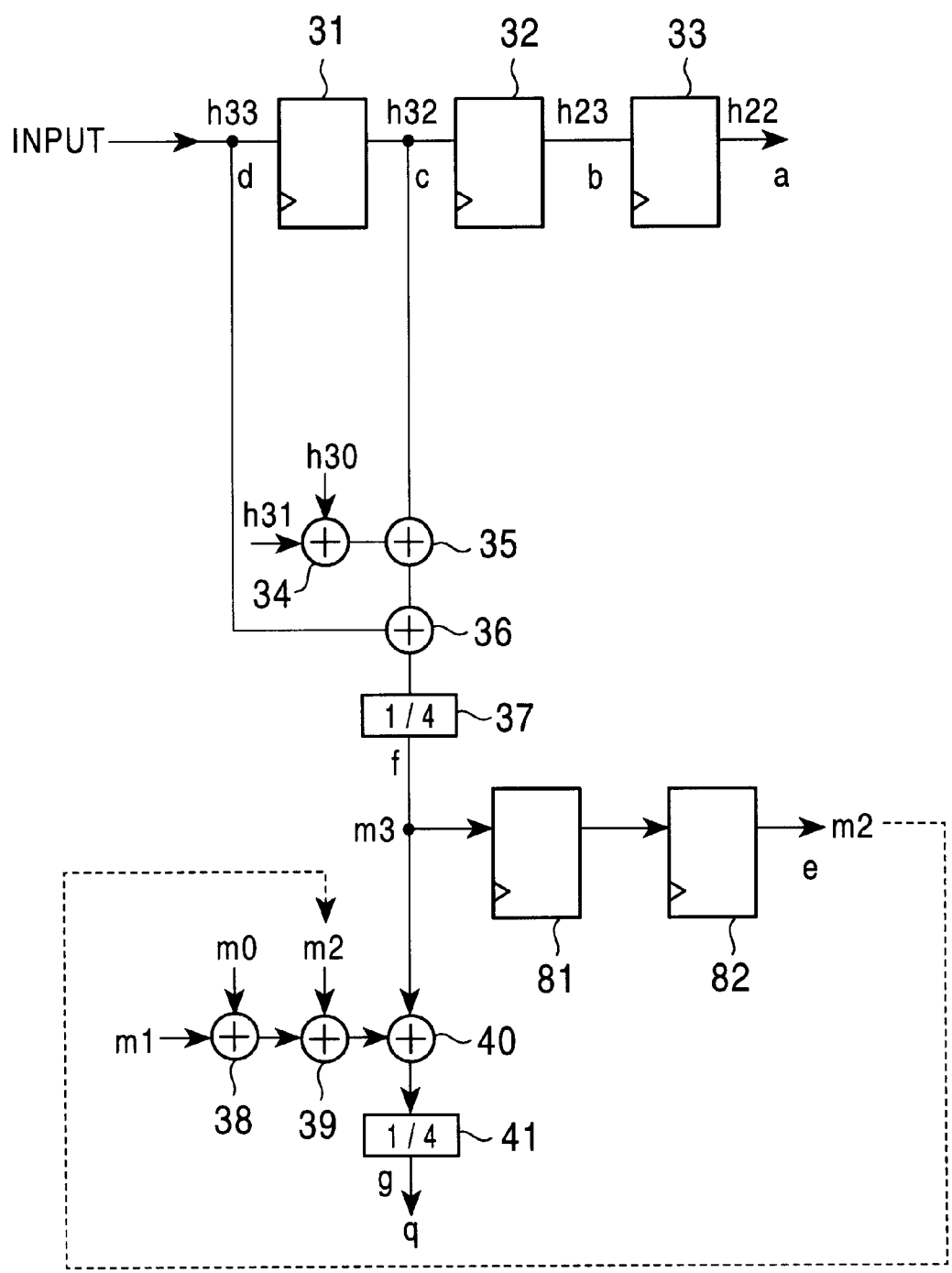
FIG. 17 is a fourth diagram describing the operation of the write element 21 shown in FIG. 13.

As shown in FIG. 17, in the latch circuits 31 through 33, the pixels h22, h23, and h32 of the fourth line of the lowest hierarchy are each latched, and when the pixel h33 is supplied to the latch circuit 31, the pixels h30 and h31 from the read buffer 24 are supplied to the computing device 34. Then, with the computing devices 34 through 37 in the same manner as described above, the second hierarchy pixel m3 (=(h30+h31+h32+h33)/4) is obtained.

The pixel m2 of the second hierarchy output earlier from the computing device 37 is sequentially latched by the latch circuits 81 and 82 and output.

As shown in FIG. 17, the pixels m0 and m1 from the read buffer 24 are supplied to the computing device 38, and the pixel m2 from the latch circuit 82 are supplied to the computing device 39. Then, with the computing devices 38 through 41, in the same manner as described above, the third hierarchy pixel q (=(m0+m1+m2+m3)/4) is obtained.

Each of the pixels output by the write element 21 is latched by the write buffer 22 in the same manner as the case shown in FIG. 8, and written to the memory cell array 23.

With the storage device shown in FIG. 7, in order to perform writing of data to the memory cell array 23 and reading of data from the memory cell array 23 is an asynchronous manner, two reading buffers, read buffer 24 and 25 are provided. A single buffer may serve as both the write buffer 22 used at the time of writing and the read buffer 24, the reading buffer serving as the read buffer 25 alone.

Figure 18:
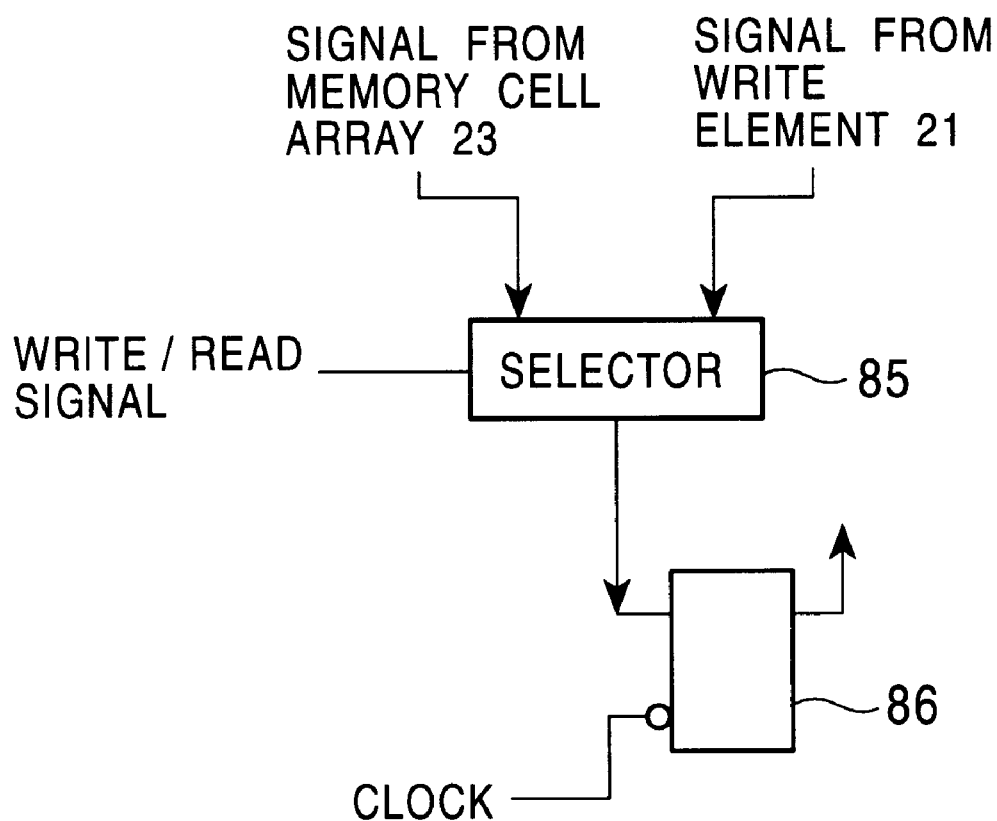
FIG. 18 is a diagram illustrating a configuration example of cells in the case of configuring the write buffer 22 shown in FIG. 9 as an I/O port.

FIG. 18 shows a construction example of an I/O (Input/Output) port in a case where the write buffer 22 shown in FIG. 9 is comprised of an I/O port cell which is also used as a read buffer 24.

A selectors 85 is provided to the input cell 86 corresponding to each of the cells 51 through 66 shown in FIG. 9, the selector 85 being configured such that one of the signal from the write element 21 or the signal from the memory cell array 23 is selected corresponding to the Write/Read signal.

Whether data is to be written to or read from the memory cell array 23 is instructed by the Write/Read signal. In the event that the Write/Read signal instructs data to be written to the memory cell array 23, the selector 85 selects the signal from the write element 21 and outputs to the cell 86. Also, in the event that the Write/Read signal instructs data to be read from the memory cell array 23, the selector 85 selects the signal from the memory cell array 23 and outputs to the cell 86.

An arrangement may be used wherein reading is performed during the first half of the clock and writing is performed in the latter half.

Figure 19:
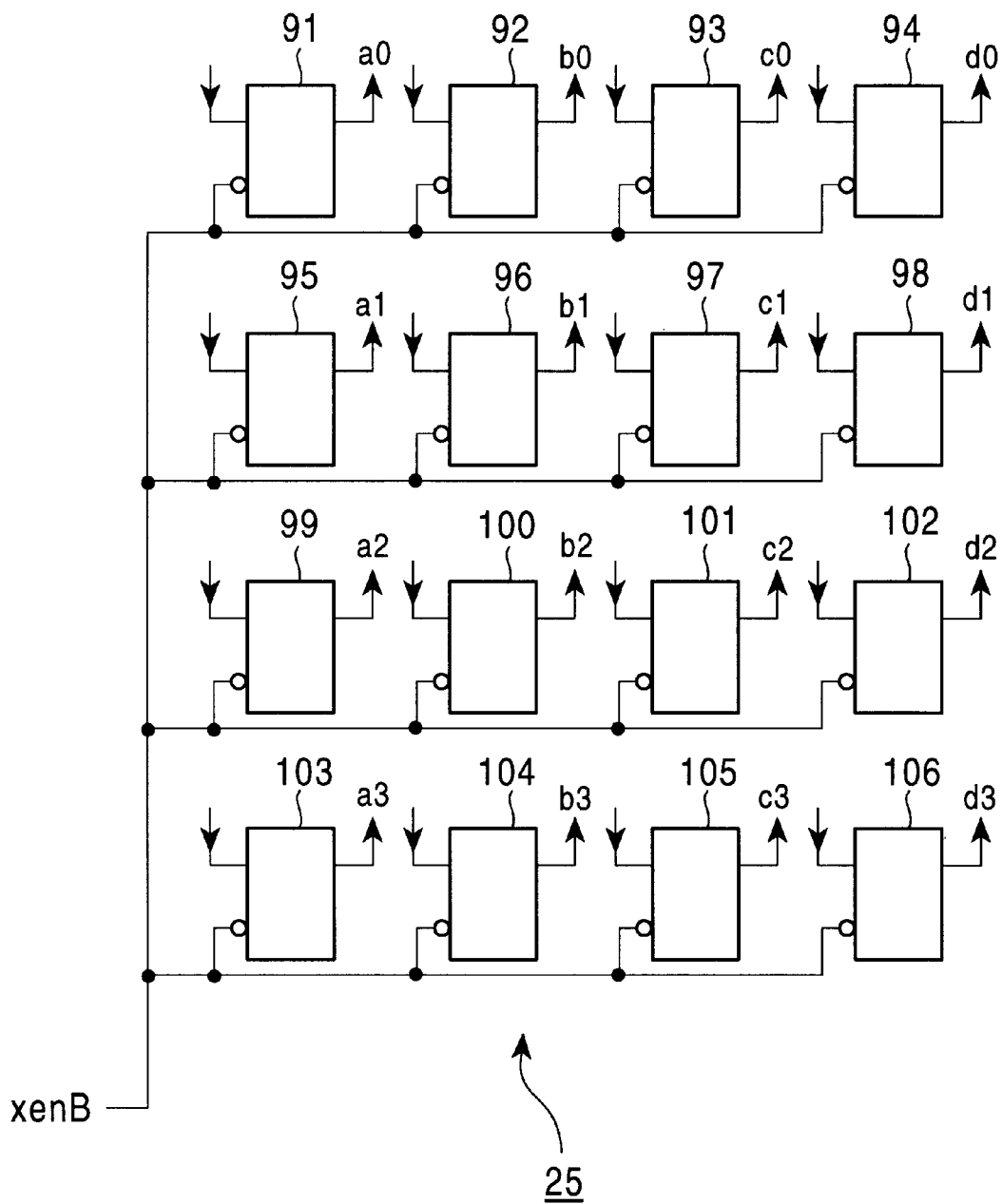
FIG. 19 is a diagram illustrating a configuration example of the read buffer 25 shown in FIG. 7.

FIG. 19 illustrates a construction example of the lead buffer 25 shown in FIG. 7.

As shown in FIG. 19, the lead buffer 25 is comprised of 16 cells 91 through 106 which store pixels in the unit of blocks. The 16 cells 91 through 106 are arrayed in a 4×4 lattice-work, and each of the cells 91 through 94, 95 through 98, 99 through 102, and 103 through 106, are configured such that clock xenB are supplied thereto. In response to the clock xenB, the pixels supplied from the memory cell array 23 are latched, and supplied to the read element 26. The read buffer 25 has the 16 cells 91 through 106 arrayed in a 4×4 lattice-work, and thereby reading pixels in the unit of blocks is carried out.

Figure 20:
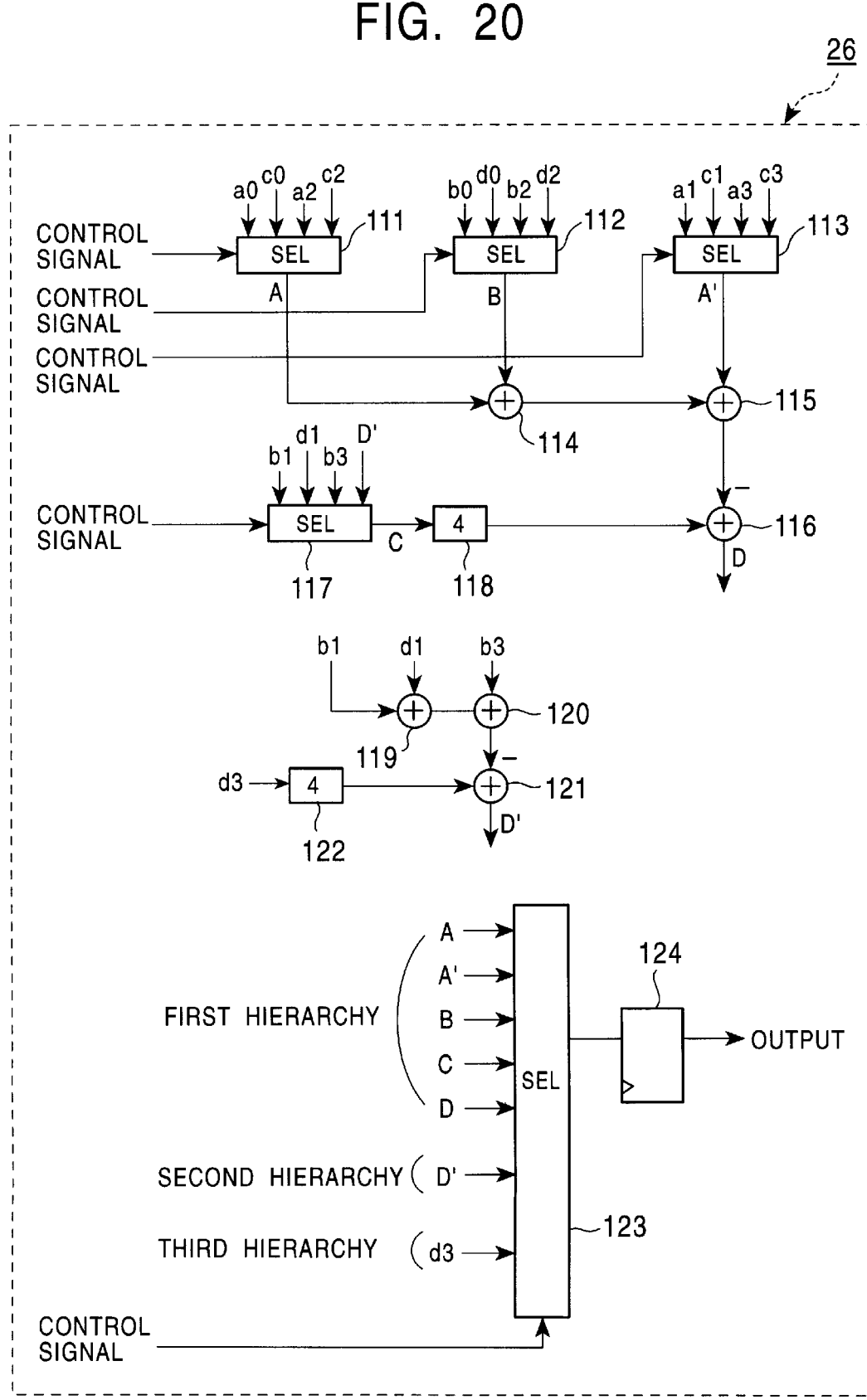
FIG. 20 is a diagram illustrating a configuration example of the read element 26 shown in FIG. 7.

FIG. 20 illustrates a construction example of the read element 26 shown in FIG. 7.

The portions of a0 through a3, b0 through b3, c0 through c3, and d0 through d3, each provided to the output of the cells 91 through 106 shown in FIG. 19, are connected to the portion with the same reference numeral/character provided to the block diagram of the read buffer 26 shown in FIG. 20. The output of the cells 91, 93, 99, and 101 in the read buffer 25 is always supplied to the selector 111 in the read element 26.

The portions with the same characters A, A', B, C, and D in FIG. 20 are also mutually connected. Accordingly, the output of the selector 111 is supplied to the selector 123 in addition to the computing device 114.

The selector 111 is constructed so as to be supplied with latch output of the cells 91, 93, 99, and 101 of the read buffer 25, and the selector 111 selects one of the latch outputs of the cells 91, 93, 99, and 101 according to the control signals being supplied from the read address controller 28, this being output to the computing device 114 and the selector 123.

The selector 112 is constructed so as to be supplied with latch output of the cells 92, 94, 100, and 102 of the read buffer 25, and the selector 112 selects one of the latch outputs of the cells 92, 94, 100, and 102 according to the control signals being supplied from the read address controller 28, this being output to the computing device 114 and the selector 123.

The selector 113 is constructed so as to be supplied with latch output of the cells 95, 97, 103, and 105 of the read buffer 25, and the selector 113 selects one of the latch outputs of the cells 95, 97, 103, and 105 according to the control signals being supplied from the read address controller 28, this being output to the computing device 115 and the selector 123.

The computing device 114 is configured such that the output of the selector 111 and the output of the selector 112 are added and supplied to the computing device 115. The computing device 115 adds the added value from the computing device 114 with the output of the selector 113, and outputs this to the computing device 116.

The computing device 116 is configured such that the output of the computing device 118 is also supplied, and the computing device 116 is configured such that the output of the computing device 115 is subtracted from the output of the computing device 118, this being supplied to the selector 123.

The selector 117 is constructed so as to be supplied with latch output of the cells 96, 98, and 104, of the read buffer 25, and output of the computing device 121, and the selector 117 selects one of the latch outputs of the cells 96, 98, and 104 or the output of the computing device 121, according to the control signals being supplied from the read address controller 28, this being output to the computing device 118 and the selector 123.

The computing device 118 is configured such that the output of the selector 117 is quadrupled by being shifted to the left by 2 bits, and then supplied to the computing device 116.

The computing device 119 is configured such that the latch output of the cells 96 and 98 of the read buffer 25 is supplied thereto, the computing device 119 adds the latch output of the cells 96 and 98, and supplies this to the computing device 120. The computing device 120 is configured such that the latch output of the cell 104 of the read buffer 25 is also supplied thereto, the computing device 120 adds the latch output of the cell 104 to the output of the computing device 119, and supplies this to the computing device 121. The computing device 121 is configured such that the output of the computing device 122 is also supplied thereto, the computing device 121 subtracts the output of the computing device 120 from the output of the computing device 122, and supplies this to the computing device 121. The computing device 122 is configured such that the latch output of the cell 106 of the read buffer 25 is also supplied thereto, the computing device 122 is configured such that the latch output of the cell 106 is quadrupled by being shifted to the left by 2 bits, and then supplied to the computing device 121.

The selector 123 is configured so as to be supplied with the output of the selectors 111 through 113 and 117, the output of the computing devices 116 and 121, and the latch output of the cell 106 of the read buffer 25, the selector 123 being configured so as to select one of these according to the control signal supplied from the read address controller 28, this being supplied to the latch circuit 124.

The latch circuit 124 is configured such that the output of the selector 123 is latched and output. The latch circuit 124 is for establishing the timing for outputting the pixels supplied form the selector 123, and does not need to be provided.

The operation of the storage device shown in FIG. 7 at the time of reading will be described.

Figure 21:
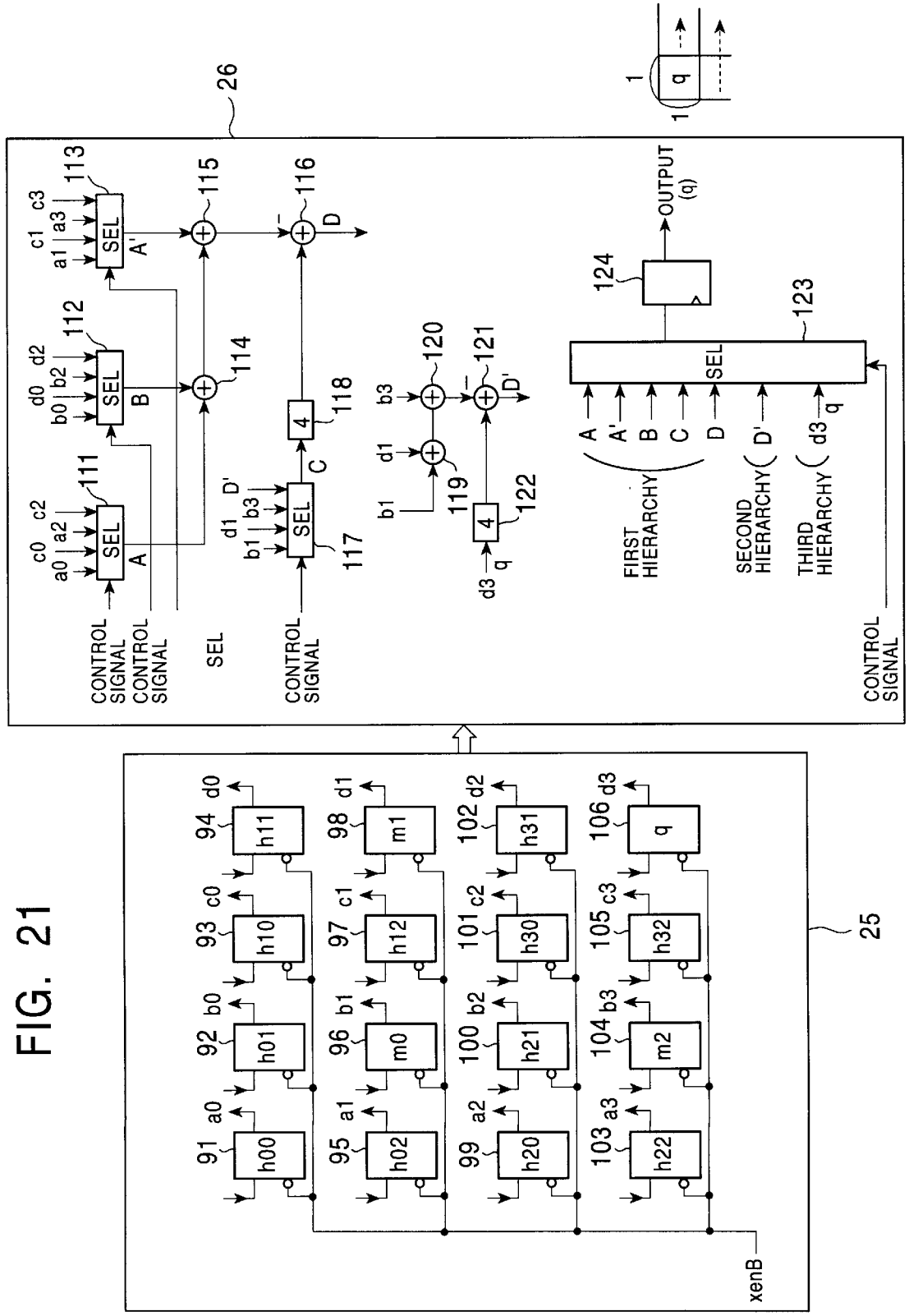
FIG. 21 is a first diagram describing the reading operation of the storage device shown in FIG. 7.

In the event that the absolute address of the pixel q of the third hierarchy is specified by an address of the format shown in FIG. 6, the 16 pixels h00 through h02, h10 through h12, h20 through h22, m0 through m2, and q, comprising the block corresponding to the pixel q are read from the memory cell array 23, and supplied to the read buffer 25. As show in FIG. 21, at the read buffer 25, the 16 pixels read from the memory cell array 23 are stored to corresponding cells.

The pixels h00, h01, h10, and h11 of the first line are stored to the respective cells 91 through 94 of the first line, the pixels h02, m0, h12, and m1 of the second line are stored to the respective cells 95 through 98 of the second line, the pixels h20, h21, h30, and h31 of the third line are stored to the respective cells 99 through 102 of the third line, and the pixels h22, m2, h32, and q of the fourth line are stored to the respective cells 103 through 106 of the fourth line.

In the event that the layer flag is 10B which means that reading of the pixel q of the third hierarchy (highest hierarchy) is specified, a control signal which instructs the selector 123 to select the latch output of the cell 106 is supplied to the selector 123. The selector 123 selects the latch output of the cell 106 (d3), i.e., the pixel q of the third hierarchy, and outputs this.

Figure 22:
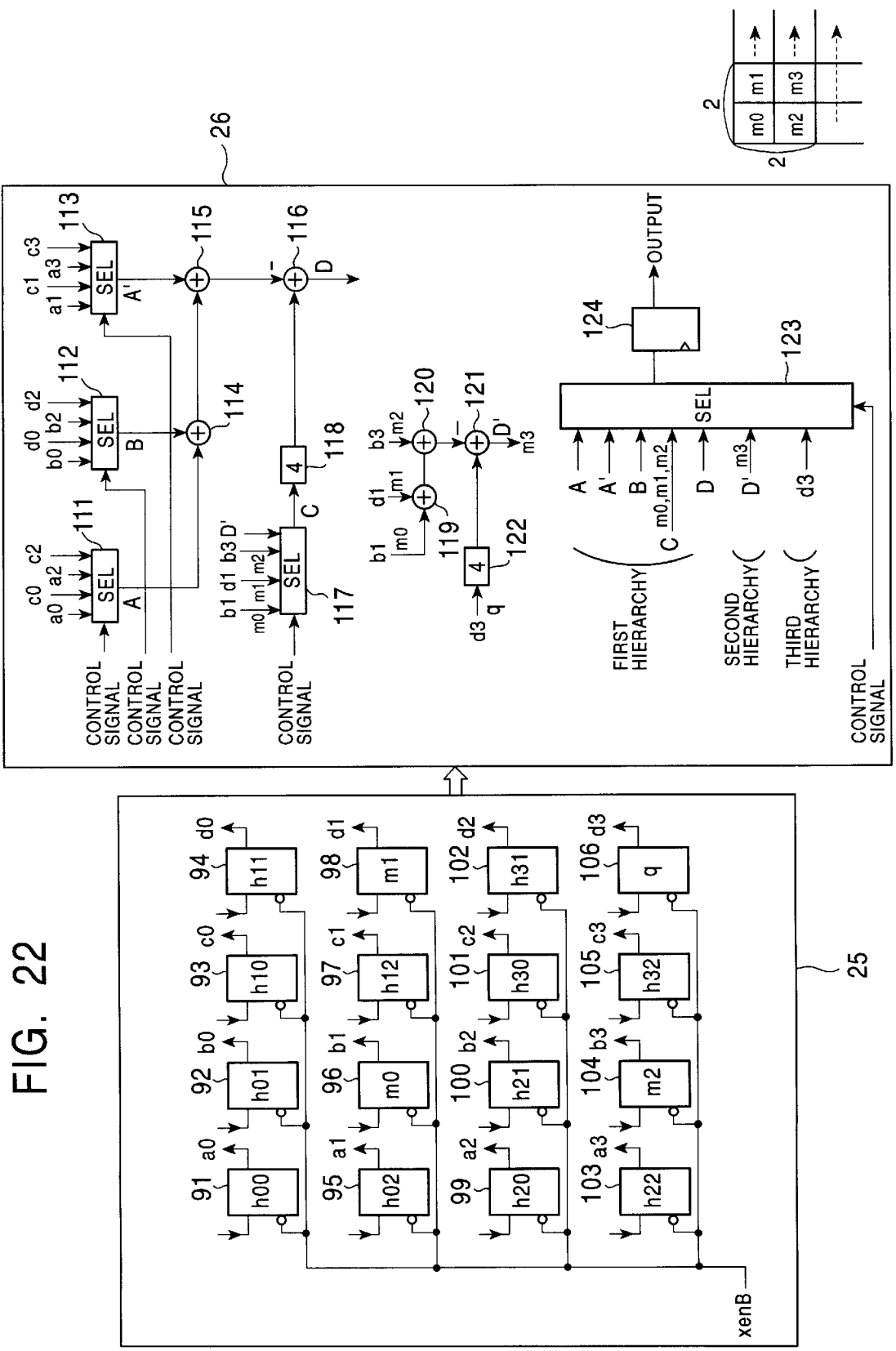
FIG. 22 is a second diagram describing the reading operation of the storage device shown in FIG. 7.

In the event that the layer flag is 01B which means that reading of the pixels m0 through m3 of the second hierarchy is specified, as shown in FIG. 22, the latch output of the cells 96 and 98, i.e., pixels m0 and m1 are added at the computing device 119, and the added value (m0+m1) is supplied to the computing device 120. At the computing device 120, the output of the computing device 119 and the latch output of the cell 104, i.e., pixel m2 are added, and the added value (m0+m1+m2) is supplied to the computing device 121.

At the computing device 122, the latch output of the cell 106, i.e., pixel q is quadrupled, and the multiplied value (4×q) is supplied to the selector 123.

At the computing device 121, the addition results (m0+m1+m2) from the computing device 120 are subtracted from the multiplication results (4×q) from the computing device 122, thereby obtaining the pixel m3 (=4×m3−(h30+h31+h32)). The pixel m3 obtained by the computing device 121 is supplied to the selector 123.

Signals for selecting the latch output of the cells 96, 98, and 104 (b1, d1, b3), i.e., pixels m0 through m2 are sequentially supplied to the selector 117. Accordingly, pixels m0 through b2 are sequentially supplied from the selector 117 to 123.

A control signal is supplied to the selector 123 for selecting the output (C) of the selector 117, and accordingly, pixels m0 through m2 supplied from the selector 117 are sequentially output from the selector 123.

A control signal is supplied to the selector 123 for selecting the output (D') of the computing device 121, and accordingly, the pixel m3 supplied from the computing device 121 are sequentially output from the selector 123.

Thus, the pixels m0 through m3 of the second hierarchy are read out.

Figure 23:
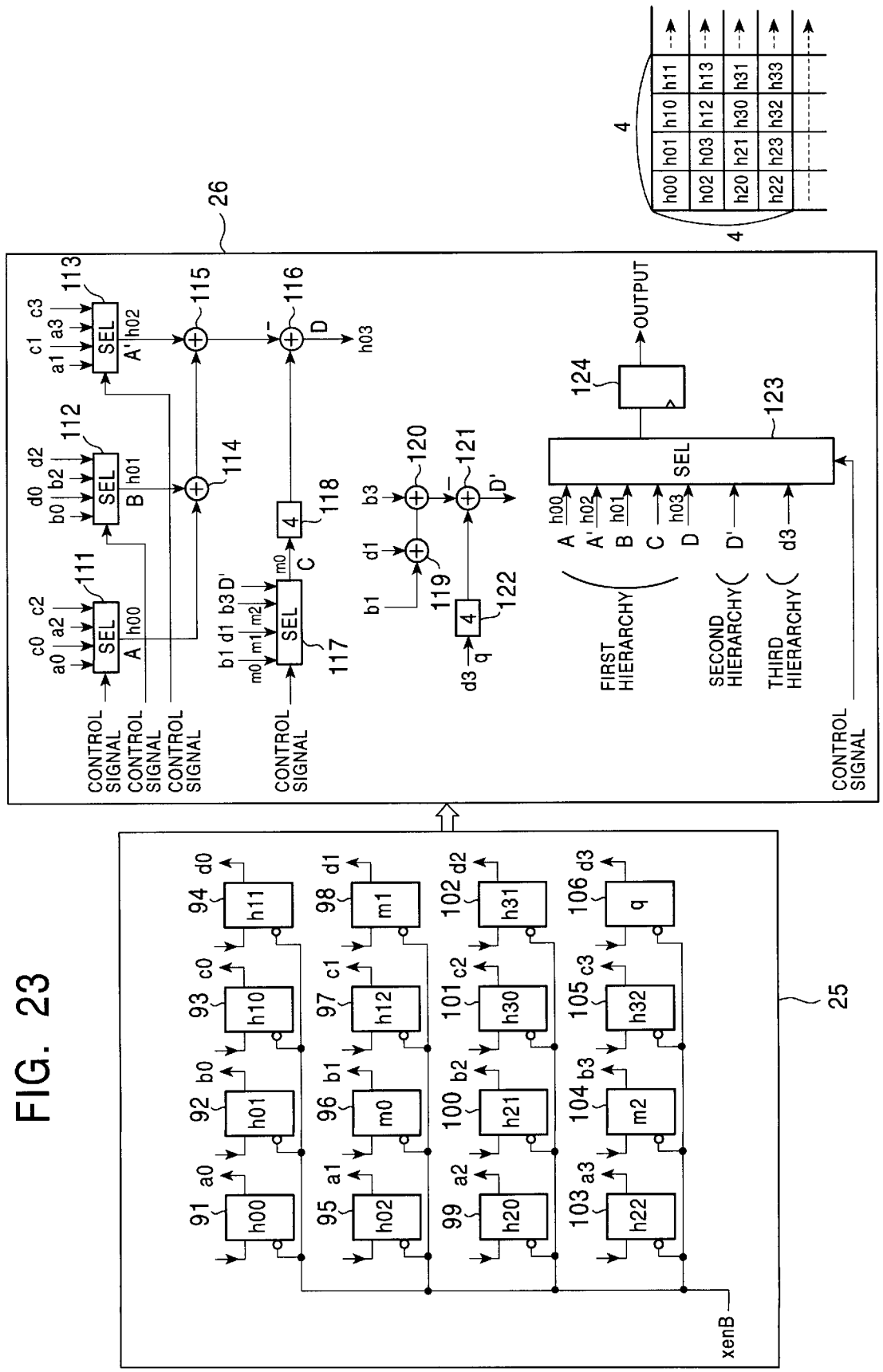
FIG. 23 is a third diagram describing the reading operation of the storage device shown in FIG. 7.

In the event that the layer flag is 00B which means that reading of the pixels h00 through 03, h10 through 13, h20 through 23, and h30 through 33 of the first hierarchy is specified, control signals are supplied to the selectors 111 through 113 such that the latch output of the cells 91, 92, and 95 (a0, b0, a1), and thus pixels h00, h01, and h02 are each output from the selectors 111 through 113, as shown in FIG. 23. The pixels h00 and h01 are supplied to the computing device 114 and selector 123, and the pixel h02 is supplied to the computing device 115 and selector 123.

The pixel h00 from the selector 111 and the pixel h01 from the selector 112 are added at the computing device 114, and the added value (h00+h01) is supplied to the computing device 115. At the computing device 115, the output of the computing device 114 and the pixel h02 from the selector 113 are added, and the added value (h00+h01+h02) is supplied to the computing device 116.

The latch output (b1) of the cell 96, i.e., a control signal for selecting pixel m0 is supplied to the selector 117. The pixel m0 is supplied from the selector 117 to the computing device 118, as shown in FIG. 23. At the computing device 118, the pixel m0 from the selector 117 is quadrupled, and the multiplied value (4×m0) is supplied to the selector 116.

At the computing device 116, the addition results (h00+h01+h02) from the computing device 115 are subtracted from the multiplication results (4×m0)from the computing device 118, thereby obtaining the pixel h03 (=4×m0−(h00+h01+h02)). The pixel h03 stored by the computing device 116 is supplied to the selector 123.

The selector 123 sequentially selects the output of the selectors 111 through 113 (A, B, A'), and a control signal for selecting the output (D) of the computing device 116 is supplied. Thus, the selector 123 sequentially outputs the pixels h00 through h03.

Figure 24:
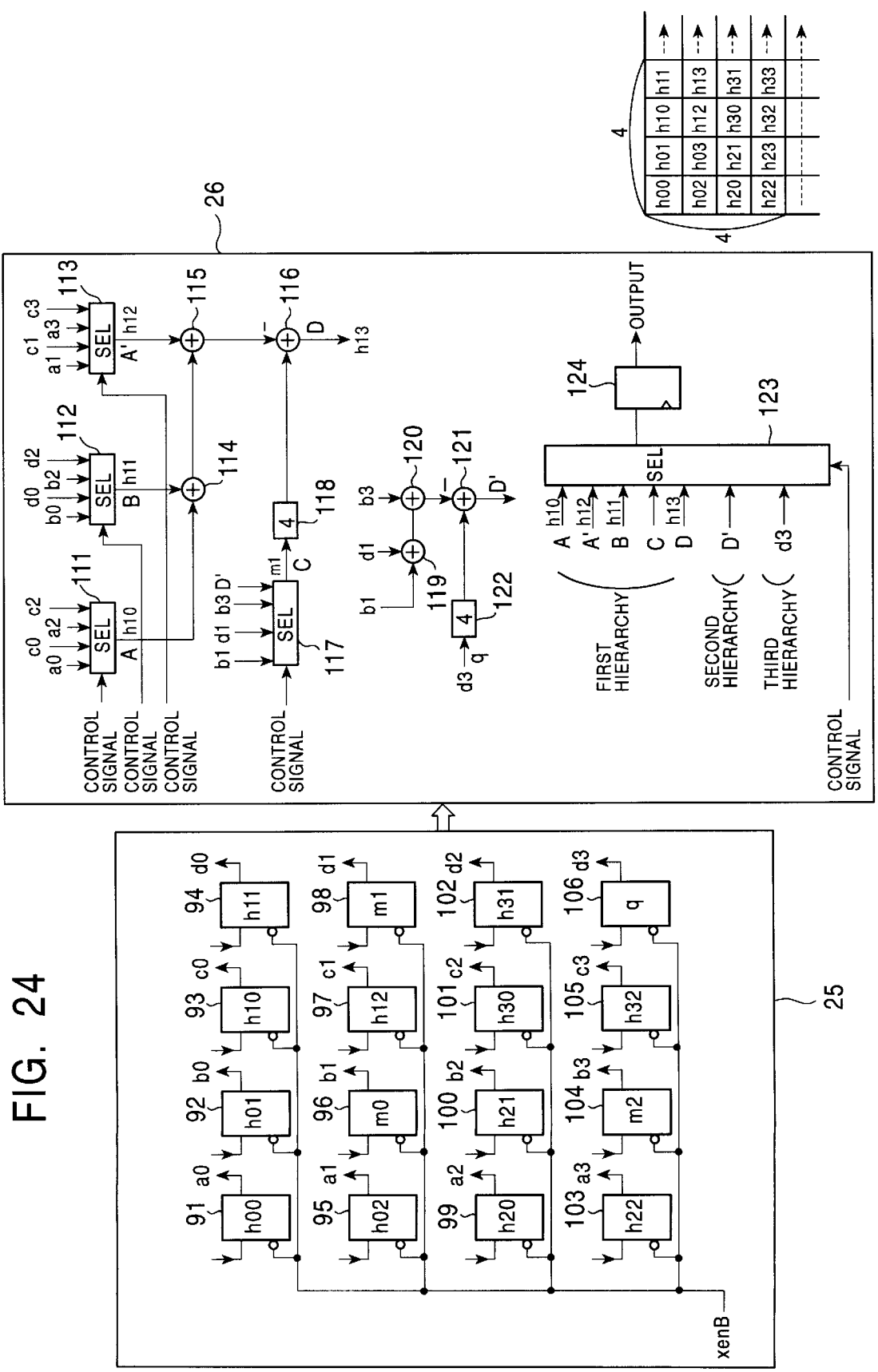
FIG. 24 is a fourth diagram describing the reading operation of the storage device shown in FIG. 7.

The selectors 111 through 113 are supplied with control signals instructing selection of the latch output of the cells 93, 94, and 97 (c0, d0, c1), and accordingly, the pixels h10, h11, and h12 are output from the selectors 111 through 113, as shown in FIG. 24. The pixels h10 and h11 are supplied to the computing device 114 and the selector 123, and the pixel h12 is supplied to the computing device 115 and the selector 123.

Processing the same as above is performed regarding the computing devices 114 and 115, and the added value of the pixels h10 through h12 (h10+h11+h12) is supplied from the computing device 115 to the computing device 116.

The latch output (d1) of the cell 98, i.e., a control signal for selecting pixel m1 is supplied to the selector 117. The pixel m1 is supplied from the selector 117 to the computing device 118, as shown in FIG. 24. At the computing device 118, the pixel m1 from the selector 117 is quadrupled, and the multiplied value (4×m1) is supplied to the computing device 116.

At the computing device 116, the addition results (h10+h11+h12) from the computing device 115 are subtracted from the multiplication results (4×m1) from the computing device 118, thereby obtaining the pixel h13 (=4×m1−(h10+h11+h12)). The pixel h13 obtained by the computing device 116 is supplied to the selector 123.

The selector 123 sequentially selects the output of the selectors 111 through 113 (A, B, A'), and a control signal for selecting the output (D) of the computing device 116 is supplied. Thus, the selector 123 sequentially outputs the pixels h10 through h13.

The selectors 111 through 113 are supplied with control signals instructing selection of the latch output of the cells 99, 100, and 103 (a2, b2, a3), and accordingly, the pixels h20, h21, and h22 are output from the selectors 111 through 113, as shown in FIG. 25. The pixels h20 and h21 are supplied to the computing device 114 and the selector 123, and the pixel h22 is supplied to the computing device 115 and the selector 123.

Processing the same as above is performed regarding the computing devices 114 and 115, and the added value of the pixels h20 through h22 (h20+h21+h22) is supplied from the computing device 115 to the computing device 116.

The latch output (b3) of the cell 104, i.e., a control signal for selecting pixel m2 is supplied to the selector 117. The pixel m2 is supplied from the selector 117 to the computing device 118, as shown in FIG. 25. At the computing device 118, the pixel m2 from the selector 117 is quadrupled, and the multiplied value (4×m2) is supplied to the computing device 116.

At the computing device 116, the addition results (h20+h21+h22) from the computing device 115 are subtracted from the multiplication results (4×m2) from the computing device 118, thereby obtaining the pixel h23 (=4×m2−(h20+h21+h22)). The pixel h23 obtained by the computing device 116 is supplied to the selector 123.

The selector 123 sequentially selects the output of the selectors 111 through 113 (A, B, A'), and a control signal for selecting the output (D) of the computing device 116 is supplied. Thus, the selector 123 sequentially outputs the pixels h20 through h23.

The selectors 111 through 113 are supplied with control signals instructing selection of the latch output of the cells 101, 102, and 105 (c2, d2, c3), and accordingly, the pixels h30, h31, and h32 are output from the selectors 111 through 113, as shown in FIG. 26. The pixels h30 and h31 are supplied to the computing device 114 and the selector 123, and the pixel h32 is supplied to the computing device 115 and the selector 123.

Processing the same as above is performed regarding the computing devices 114 and 115, and the added value of the pixels h30 through h32 (h30+h31+h32) is supplied from the computing device 115 to the computing device 116.

The latch output of the cells 96 and 98, i.e., the pixel m0 and m1 are added at the computing device 119, and the added value (m0+m1) is supplied to the computing device 120. The output of the computing device 119 and the latch output of the cell 104, i.e., pixel m2 are added at the computing device 120, and the added value (m0+m1+m2) is supplied to the computing device 121. At the computing device 122, latch output of the cell 106, i.e., the pixel q is quadrupled, and the multiplied value (4×q) is supplied to the computing device 121.

At the computing device 116, the addition results (m0+m1+m2) from the computing device 120 are subtracted from the multiplication results (4×q) from the computing device 122, thereby obtaining the pixel m3 (=4×q−(m0+m1+m2)). The pixel m3 obtained by the computing device 121 is supplied to the selector 117.

A control signal for selecting the latch output (D') of the computing device 121 is supplied to the selector 117, i.e., a control signal is supplied instruction selecting of the pixel m3. Thus, the selector 117 outputs the pixel m3 to the computing device 118, as shown in FIG. 26. At the computing device 118, the pixel m3 from the selector 117 is quadrupled, and the multiplied value (4×m3) is supplied to the computing device 116.

At the computing device 116, the addition results (h30+h31+h32) from the computing device 118 are subtracted from the multiplication results (4×m3) from the computing device 118, thereby obtaining the pixel h33 (=4×m3−(h30+h31+h32)). The pixel h33 obtained by the computing device 116 is supplied to the selector 123.

The selector 123 sequentially selects the output of the selectors 111 through 113 (A, B, A'), and a control signal for selecting the output (D) of the computing device 116 is supplied. Thus, the selector 123 sequentially outputs the pixels h30 through h33.

Thus, the pixels h00 through h03, h10 through h13, h20 through h23, and h30 through h33, of the first hierarchy are read out.

Reading is performed in the same way for the other blocks, as well.

The arrangement is such that data reading and writing to and from the memory cell array 23 is performed in units of blocks, and the memory cell array 23 has been arranged so as to be used also as a delay circuit wherein line delay is performed, so there is no need for a delay circuit.

Using the storage device as described above, a coarse search can be made using the screen of the third hierarchy which is a low-resolution image, following which lower hierarchy images which are higher in resolution are used sequentially, thereby enabling application to image searching devices which perform high-precision searching, or to image processing devices capable of output of images with differing resolution.

The present invention has been described with reference to an image which is two-dimensional data, but the present invention can also be applied to one-dimensional data, or audio data or text data.

The present embodiment has been described with an arrangement in which each block shown in FIG. 7 are formed on a single chip, but several blocks thereof may be externally connected.

Though the number of hierarchical tiers has been described as 3 in the present embodiment, the number thereof may be 2, or 4 or more.

Though the present embodiment has been described with an arrangement in which one pixel of a higher hierarchy is created from four pixels on a lower hierarchy, the number of pixel of the higher hierarchy may be three pixels on the lower hierarchy, or 5 or more.

Though the present embodiment has been described with an arrangement in which the pixel to the lower right of the four pixels is replaced with the pixel of the upper hierarchy created from the four pixels, but other lower hierarchy pixels may be replaced with the pixel of the upper hierarchy.

Further, though the present embodiment has been described with an arrangement in which the average of the four lower hierarchy pixels is used as the higher hierarchy pixel, but an arrangement may be used wherein the sum of the four lower hierarchy pixels is used as the higher hierarchy pixel.

In the event of displaying the screen of the higher hierarchy, the pixels of the higher hierarchy must be divided by 4 and averaged.

The number of bits of the pixels of the higher hierarchy may be greater than the number of bits of the pixels of the lower hierarchy. In the event that the number of bits of the pixels of the lower hierarchy is 8 bits, the number of bits of the pixels of the higher hierarchy may be as many as 10. The cells comprising the memory cell array 23 must take such increase in number of bits into consideration. However, in the event that there is no problem in margin of error by rounding the pixels of the higher hierarchy, the cells comprising the memory cell array 23 may all be of the same number of bits. In the above case, all cells may be 8 bits.

What is claimed is:

1. A storage device formed on a single chip, comprising:

computing means for computing a higher order hierarchy data from a lower order hierarchy data by computing one piece of higher order hierarchy data from N pieces of said lower order hierarchy data;

storage means for storing said lower order hierarchy data and said higher order hierarchy data in units of blocks such that the combined lower and higher order hierarchy data occupies the same number of blocks as said lower order hierarchy data alone; each block being comprised of N minus 1 pieces of said lower order hierarchy data and one piece of said higher order hierarchy data; and wherein each piece of stored hierarchy data is designated by a hierarchy layer flag representing the hierarchy to which the piece belongs, an absolute address for the block to which the piece belongs, and a relative address within the block to which the piece belongs.

2. A storage device according to claim 1, further comprising a second computing means by which the one piece in each block of said lower order hierarchy data not stored is computed from the N minus 1 pieces of said lower order hierarchy data and one piece of said higher order hierarchy data which are stored; said second computing means also being formed on said single chip.

3. The storage device according to claim 1, wherein at least one intermediate order hierarchy data is computed by said computing means between said higher order hierarchy data and said lower order hierarchy data; said intermediate order hierarchy data also being stored by said storage means in units of blocks such that the combined lower, intermediate, and higher order hierarchy data occupies the same number of blocks as said lower order hierarchy data alone.

4. The storage device according to claim 1, further comprising a plurality of buffers to hold data while reading and writing data to the storage device.

5. The storage device according to claim 1, further comprising a control signal to designate which order hierarchy data is to be accessed from said storage means.

6. The storage device according to claim 1, wherein the data is computed and stored in real-time.

7. An information processing method for processing hierarchical data on a single chip, comprising the steps of:

computing a higher order hierarchy data from a lower order hierarchy data by computing one piece of higher order hierarchy data from N pieces of said lower order hierarchy data;

storing said lower order hierarchy data and said higher order hierarchy data in units of blocks such that the combined lower and higher order hierarchy data occupies the same number of blocks as said lower order hierarchy data alone; each block being comprised of N minus 1 pieces of said lower order hierarchy data and one piece of said higher order hierarchy data; and wherein each piece of stored hierarchy data is designated by a hierarchy layer flag representing the hierarchy to which the piece belongs, an absolute address for the block to which the piece belongs, and a relative address within the block to which the piece belongs.

8. An information processing method according to claim 7, further comprising a second computing step for computing the one piece in each block of said lower order hierarchy data not stored from the N minus 1 pieces of said lower order hierarchy data and one piece of said higher order hierarchy data which are stored.

9. The information processing method according to claim 7, wherein at least one intermediate order hierarchy data is computed between said higher order hierarchy data and said lower order hierarchy data; said intermediate order hierarchy data also being stored in units of blocks such that the combined lower, intermediate, and higher order hierarchy data occupies the same number of blocks as said lower order hierarchy data alone.

10. The information processing method according to claim 7, wherein data is buffered in a plurality of buffers while waiting to be processed.

11. The information processing method according to claim 7, wherein the order of the hierarchy data to be processed is designated by a control signal.

12. The information processing method according to claim 7, wherein the data is computed and stored in real-time.

* * * * *